(12) United States Patent  
Tetsuka et al.

(10) Patent No.: US 7,090,602 B2
(45) Date of Patent: Aug. 15, 2006

(54) ASSISTING APPARATUS FOR CHANGING SPEEDS IN A BICYCLE TRANSMISSION

(75) Inventors: Toshio Tetsuka, Sakai (JP); Tetsuya Hino, Shimonoseki (JP)

(73) Assignee: Shimano, Inc., Sakai (JP)

( * ) Notice: Subject to any disclaimer, the term of this patent is extended or adjusted under 35 U.S.C. 154(b) by 44 days.

(21) Appl. No.: 10/372,582

(22) Filed: Feb. 20, 2003

(65) Prior Publication Data
US 2004/0005949 A1   Jan. 8, 2004

Related U.S. Application Data

(63) Continuation-in-part of application No. 10/190,461, filed on Jul. 5, 2002.

(51) Int. Cl.
*B60K 20/04* (2006.01)
(52) U.S. Cl. ...................... 474/78; 74/473.14
(58) Field of Classification Search ........... 474/78, 474/80, 81, 82; 74/473.14, 473.28
See application file for complete search history.

(56) References Cited

U.S. PATENT DOCUMENTS 4,676,118 A * 6/1987 Leiter .................. 74/473.28
5,020,387 A 6/1991 Nagano
5,358,451 A 10/1994 Lacombe et al.
5,445,046 A * 8/1995 Kataumi et al. ............. 74/527
5,618,241 A 4/1997 Ose
6,443,032 B1 9/2002 Fujii et al.
6,607,457 B1 8/2003 Kawakami

* cited by examiner

Primary Examiner—Vicky A. Johnson
(74) Attorney, Agent, or Firm—James A. Deland

(57) ABSTRACT

A power saving apparatus is provided for an assisting apparatus that uses power from a rotating member to assist the operation of a bicycle transmission. The power saving apparatus comprises a rotating member engaging member that moves between a rotating member engaging position and a rotating member disengaging position, a setting mechanism that sets the rotating member engaging member toward the rotating member engaging position, and a power saving unit. The power saving unit saves power communicated between the setting mechanism and the rotating member engaging member when the setting mechanism attempts to move the rotating member engaging member into the rotating member engaging position and the rotating member engaging member encounters a force that resists the rotating member engaging member being in the rotating member engaging position.

36 Claims, 26 Drawing Sheets

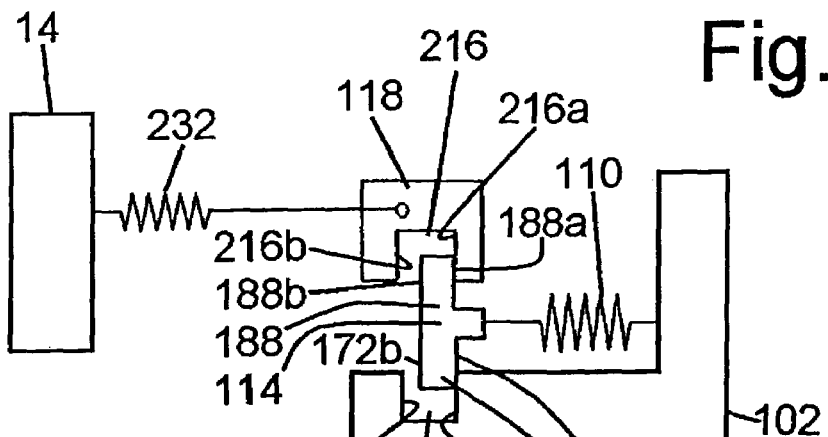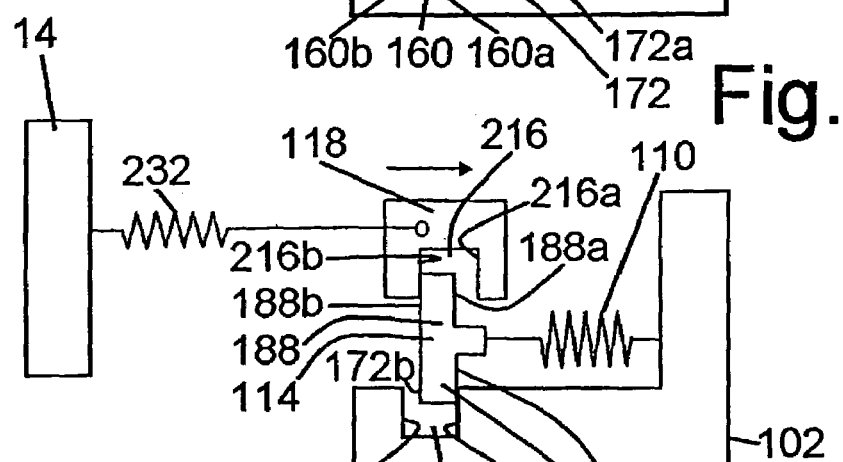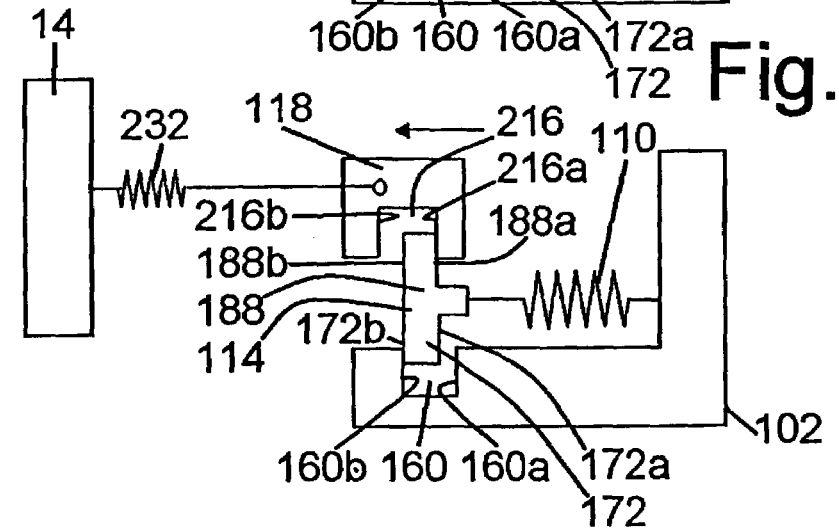

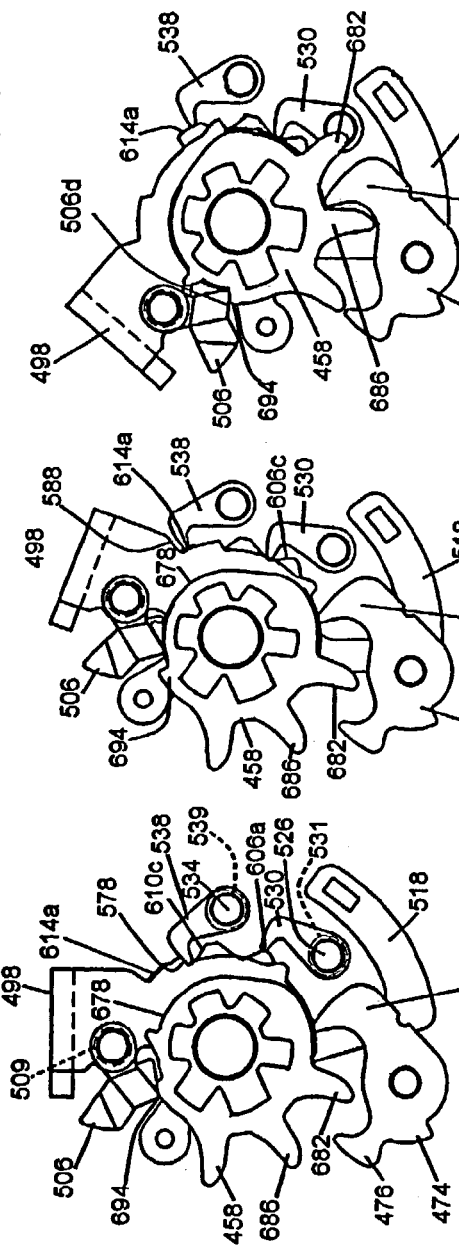

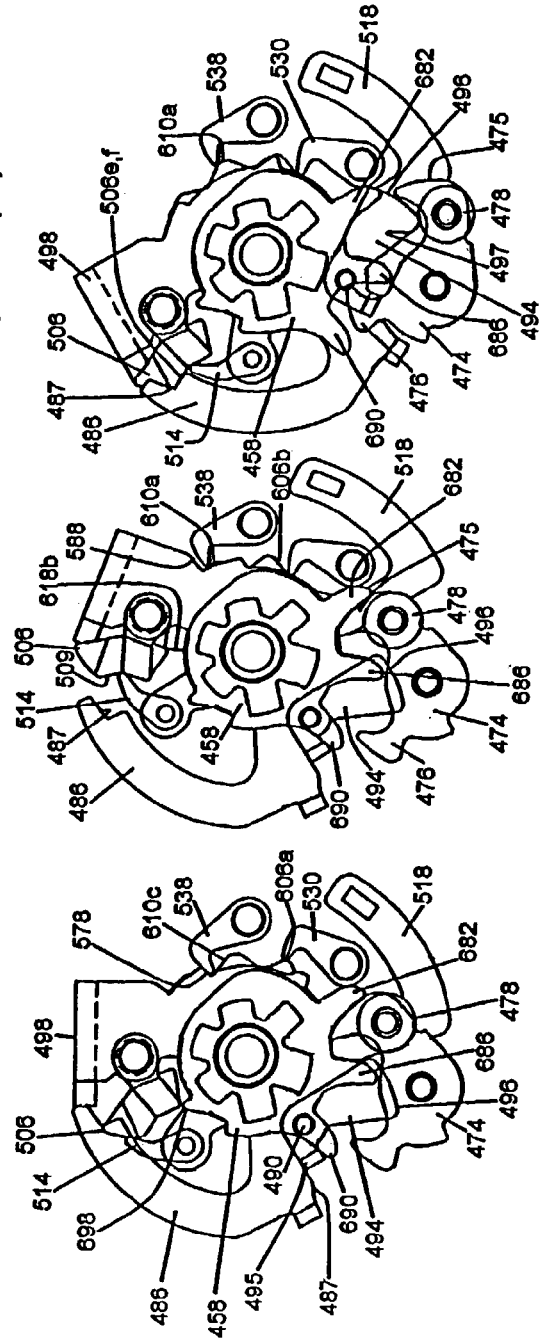

ASSISTING APPARATUS FOR CHANGING SPEEDS IN A BICYCLE TRANSMISSION

CROSS REFERENCE TO RELATED APPLICATION

This application is a continuation-in-part of application Ser. No. 10/190,461, filed Jul. 5, 2002.

BACKGROUND OF THE INVENTION

The present invention is directed to bicycle transmissions and, more particularly, to an apparatus for assisting a change speed operation in the bicycle transmission.

Various devices have been developed to help reduce the effort needed to operate bicycle transmissions such as derailleurs and internal hub transmissions. Examples of such devices particularly suited to assist the operation of derailleur transmissions are shown in U.S. Pat. No. 5,358,451. The devices shown therein for assisting the operation of a rear derailleur employ multiple moving parts that are in constant motion, thus increasing the amount of moving mass as well as the possibility of premature wear on the components.

The assignee's copending application Ser. No. 10/190,461 discloses an assist mechanism for a bicycle transmission that overcomes such problems. More specifically, that application discloses an assisting apparatus for using power from a rotating member to assist the operation of a bicycle transmission, wherein the assisting apparatus comprises a mounting unit; an input transmission member coupled to the mounting unit, wherein the input transmission member moves between at least a first input position and a second input position; and an output transmission member coupled to the mounting unit, wherein the output transmission member moves between at least a first output position and a second output position. A rotating member engaging member moves between a rotating member engaging position and a rotating member disengaging position, and a motion transmitting mechanism transmits motion from the rotating member engaging member to the output transmission member. A switching mechanism moves the rotating member engaging member between the rotating member engaging position and the rotating member disengaging position in response to movement of the input transmission member and the output transmission member.

SUMMARY OF THE INVENTION

The present invention is directed to various features of an apparatus for assisting a speed change operation in a bicycle transmission, and specifically features that increase the reliability of operation of such an apparatus. In one inventive feature directed to a power saving apparatus for an assisting apparatus that uses power from a rotating member to assist the operation of a bicycle transmission, the power saving apparatus comprises a rotating member engaging member that moves between a rotating member engaging position and a rotating member disengaging position; a setting mechanism that sets the rotating member engaging member toward the rotating member engaging position; and a power saving unit that saves power communicated between the setting mechanism and the rotating member engaging member when the setting mechanism attempts to move the rotating member engaging member into the rotating member engaging position and the rotating member engaging member encounters a force that resists the rotating member engaging member being in the rotating member engaging position.

In another inventive feature, a rotation control apparatus for a bicycle device comprises a rotating member that rotates around a rotational axis, wherein the rotating member has a bias coupling portion; a reference member; a biasing mechanism coupled between the reference member and the bias coupling portion of the rotating member, wherein the biasing mechanism has a biasing vector that biases the rotating member for rotation in a first direction; and a biasing vector moving mechanism that moves the biasing vector relative to the bias coupling portion of the rotating member so that the biasing vector biases the rotating member for rotation in a second direction that is different from the first direction.

BRIEF DESCRIPTION OF THE DRAWINGS

FIGS. 4(A)–4(C) are schematic views showing the operation of the shift control device;

FIGS. 16(A)–(E) are views illustrating the operation of the assist mechanism in an upshifting direction;

FIGS. 17(A)–(F) are views illustrating the operation of the assist mechanism in a downshifting direction;

DETAILED DESCRIPTION OF THE EMBODIMENTS

Figure 1:
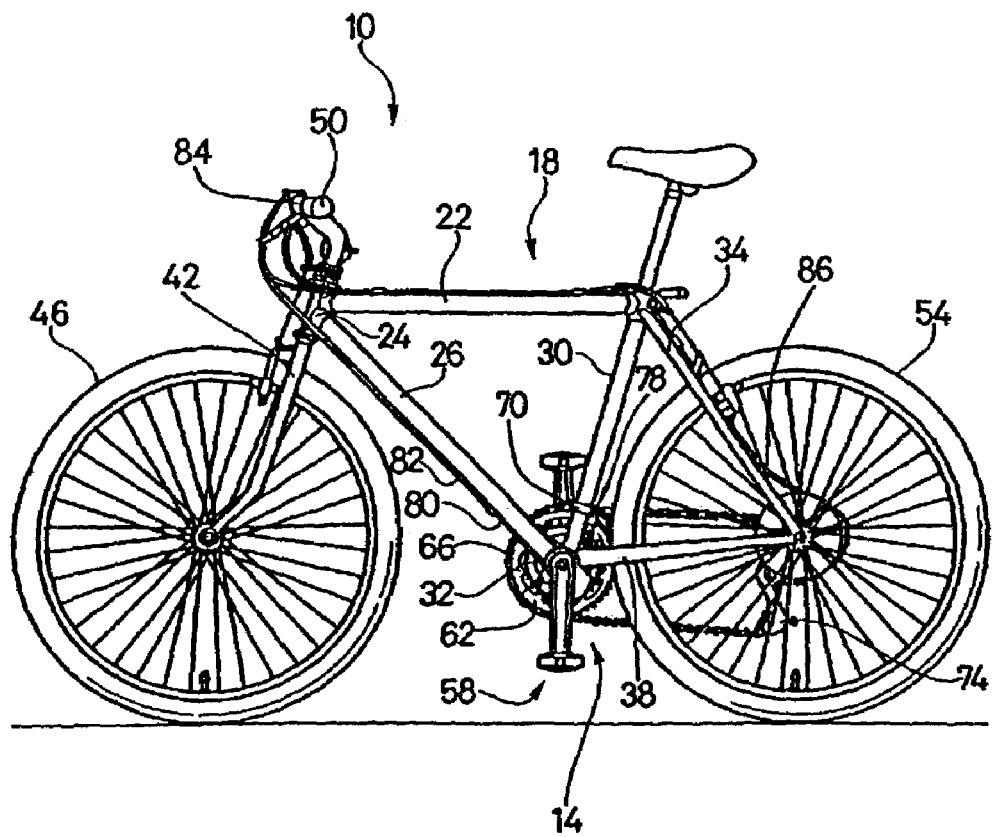
FIG. 1 is a side view of a particular embodiment of a bicycle that incorporates an apparatus according to the invention for assisting a speed change operation in a bicycle transmission.

FIG. 1 is a side view of a bicycle 10 that incorporates a particular embodiment of an assist mechanism 14 according to the invention for assisting a change speed operation in a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 extending downwardly from top tube 22, a bottom bracket 32 disposed at the junction of down tube 26 and seat tube 30, a pair of seatstays 34 extending rearwardly and downwardly from top tube 22, and a pair of chainstays 38 extending rearwardly from bottom bracket 32. A fork 42 is rotatably supported within head tube 24, and a front wheel 46 is rotatably supported to the lower end of fork 42. The rotational direction of fork 42 and wheel 46 is controlled by a handlebar 50 in a well known manner. A rear wheel 54 having a plurality of coaxially mounted freewheel sprockets (not shown) is rotatably supported at the junction of seatstays 34 and chainstays 38, and a pedal assembly 58 supporting a plurality of front (chainwheel) sprockets 62 is rotatably supported within bottom bracket 32. In this embodiment, three front sprockets 62 rotate coaxially and integrally with pedal assembly 58. A chain 66 engages one of the plurality of front sprockets 62 and one of the plurality of freewheel sprockets mounted to rear wheel 54. A front derailleur 70 moves chain 66 from one front sprocket 62 to another, and a rear derailleur 74 moves chain 66 from one freewheel sprocket to another. Both operations are well known. In this embodiment, front derailleur 70 is controlled by pulling and releasing an output control wire 78 coupled to assist mechanism 14, and assist mechanism 14 is controlled by an inner wire 80 of a Bowden-type control cable 82 connected to a shift control device 84 mounted to the left side of handlebar 50. Rear derailleur 74 is controlled by a Bowden-type control cable 86 in a conventional manner.

Figure 2:
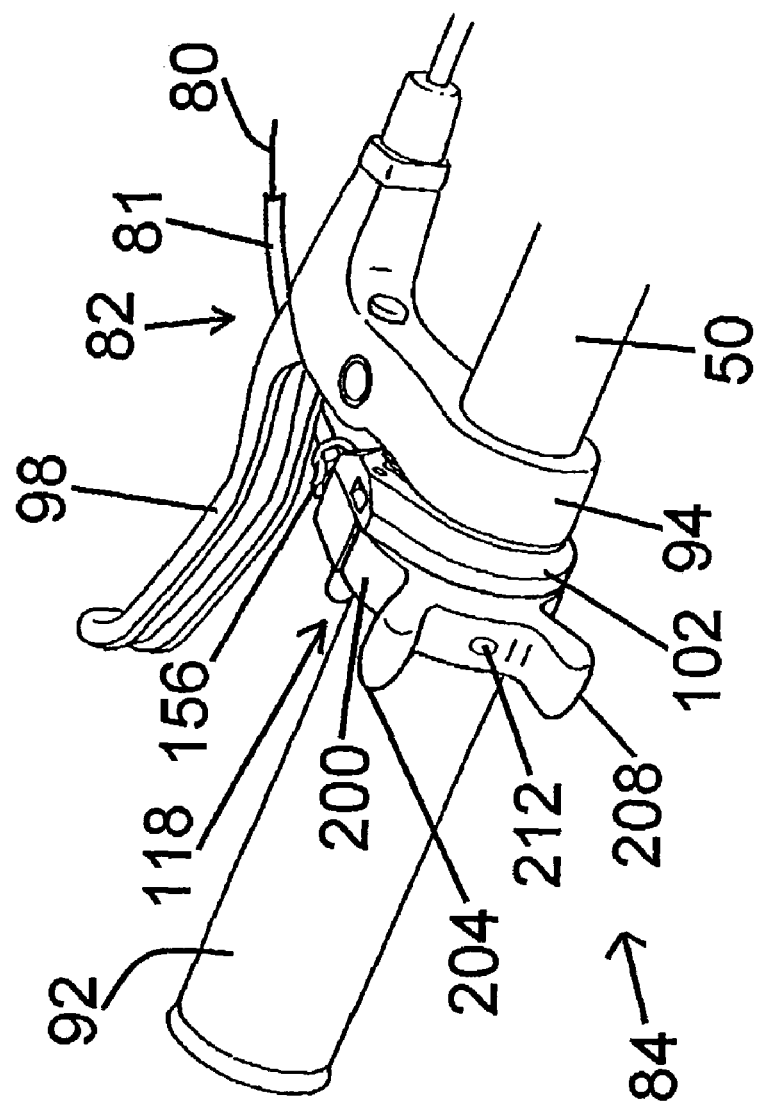
FIG. 2 is a more detailed view of the shift control device.
Figure 3:
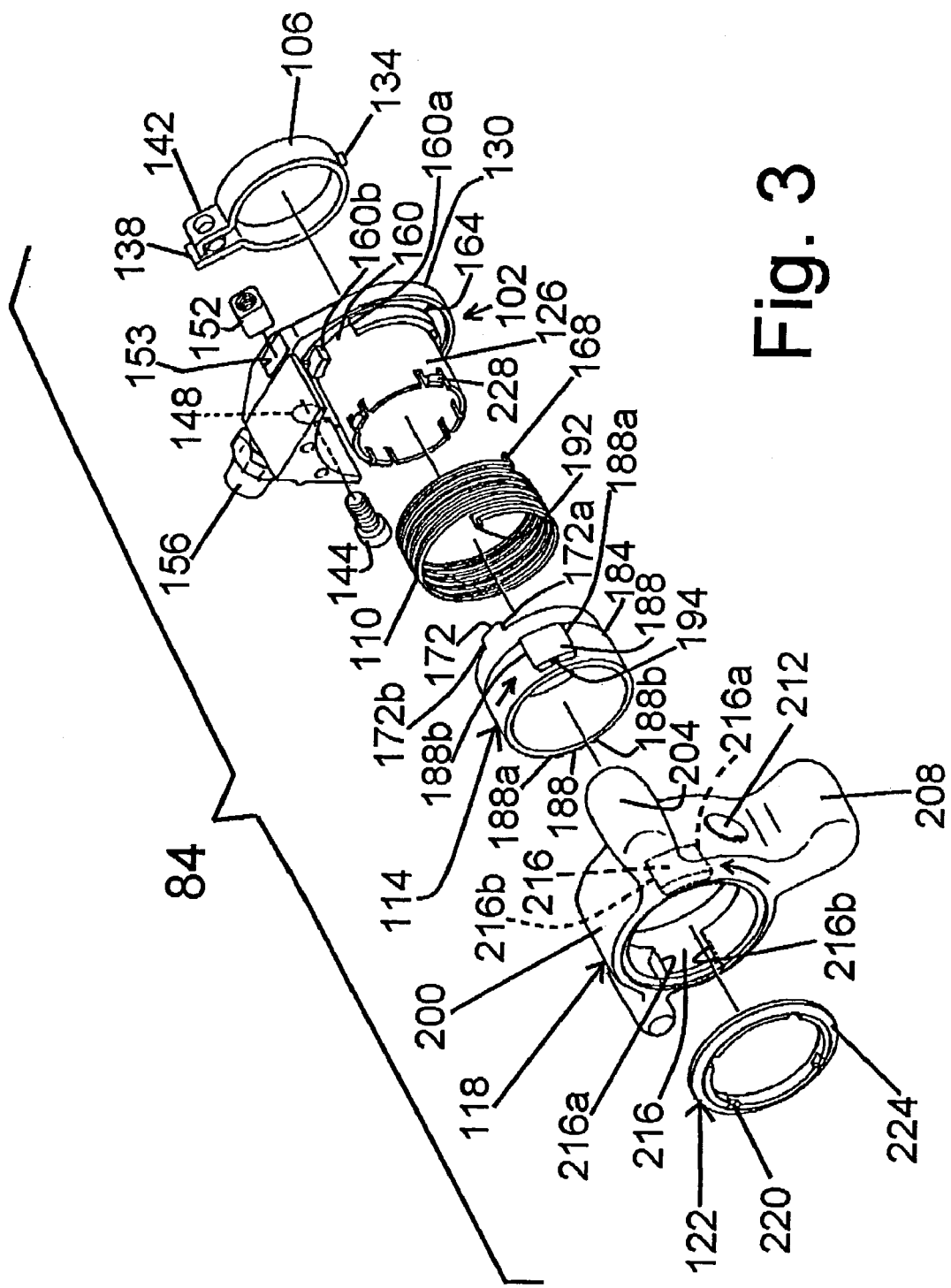
FIG. 3 is an exploded view of the shift control device shown in FIG. 2.

FIG. 2 is a view of the left side of handlebar 50 showing shift control device 84 in more detail, and FIG. 3 is an exploded view of shift control device 84. In this embodiment, shift control device 84 is mounted between a stationary handgrip 92 and a conventional brake lever bracket 94 that supports a brake lever 98. Shift control device 84 comprises a base member 102, a clamping band 106, a biasing component in the form of a spring 110, an intermediate member 114, an actuating component 118, and a retainer 122. Base member 102 comprises a tubular portion 126 and a flange portion 130. Tubular portion 126 surrounds handlebar 50, and flange portion 130 extends radially outwardly from an inner end of tubular portion 126. Clamping band 106 has a locking projection 134 and mounting ears 138 and 142, and the structure fits within an annular recess (not shown) with a locking groove formed at the inner peripheral surface of flange portion 130. A screw 144 extends through an opening 148 in flange portion 130 and through mounting ears 138 and 142 and screws into a nut 152 disposed in another opening 153 in flange portion 130 to tighten mounting ears 138 and 142 toward each other and thereby tighten clamping band 106 and fasten base member 102 to handlebar 50. A conventional screw-type adjustable control cable coupler 156 is disposed on flange portion 130 for receiving the outer casing 81 of control cable 82 in a conventional manner. Diametrically opposed recesses 160 (only one is visible in FIG. 3) having abutments 160a and 160b are formed at the junction of tubular portion 126 and flange portion 130, and a base member bias engaging component 164 in the form of a spring hole is formed in flange portion 130. An end 168 of spring 110 is fitted within spring hole 164.

Intermediate member 114 is rotatably supported on tubular portion 126 of base member 102 such that spring 110 is disposed between intermediate member 114 and flange portion 130 of base member 102. Diametrically opposed projections or stoppers 172 (only one is visible in FIG. 3) forming abutments 172a and 172b extend axially from the inner end of intermediate member 114, and a pair of diametrically opposed intermediate member projections or stoppers 188 forming abutments 188a and 188b extend radially outwardly from an outer peripheral surface 184 of intermediate member 114. An end 192 of spring 110 is fitted within a spring opening 194 (which functions as an intermediate member bias engaging component) formed in one of the stoppers 188 for biasing intermediate member 114 clockwise. As a result, abutments 172a of stoppers 172 engage abutments 160a (which function as base member stoppers) to limit the rotation of intermediate member 114 relative to base member 102.

Actuating component 118 is rotatably supported by intermediate member 114 which, as noted above, is rotatably supported by the tubular portion 126 of base member 102. Thus, actuating component 118 rotates coaxially around intermediate member 114, tubular portion 126 of base member 102, and handlebar 50. Actuating component 118 comprises a tubular member 200, first and second finger projections or levers 204 and 208 extending radially outwardly from tubular member 200, a transmission control member coupling component in the form of an opening 212 for receiving a cable end bead (not shown) attached to the end of inner wire 80 so that inner wire 80 moves integrally with actuating component 114, and diametrically opposed recesses 216 forming abutments 216a and 216b. In the assembled state, intermediate member stoppers 188 are fitted within the corresponding recesses 216 between abutments 216a and 216b so that abutments 216a and 216b function as actuating member stoppers. In this embodiment, inner wire 80 of control cable 82 is under tension as a result of a biasing component disposed in assist apparatus 14. Thus, actuating component 118 is biased in the counterclockwise direction such that abutments 188a of intermediate member stoppers 188 engage abutments 216a to limit the rotation of actuating component 118 relative to intermediate member 114 and base member 102.

Retainer 122 is fitted around the outer end of tubular member 126 of base member 102. Retainer 122 includes four recesses 220 that are evenly formed on a side surface 224 for engaging four locking tabs 228 that extend radially outwardly from the outer end of tubular portion 126 of base member 102. Thus, retainer 122 axially fixes actuating component 118 and intermediate member 114 in place on base member 102.

FIGS. 4(A)–4(C) schematically illustrate the operation of shift control device 84. FIG. 4(A) shows actuating component 118 in an actuating component neutral position. In this position, spring 110 biases intermediate member 114 clockwise (to the right in FIG. 4(A)) so that abutments 172a of stoppers 172 contact abutments 160a of recesses 160 on base member 102, and a biasing component (spring) in assist mechanism 14, indicated by reference number 232, biases actuating component 118 counterclockwise so that abutments 216a of recesses 216 contact abutments 188a of intermediate member stoppers 188. Thus, abutments 160a, 172a, 188a and 216a (and to some extent springs 110 and 232) function as neutral positioning components. Since inner wire 80 is directly coupled to actuating component 118, inner wire 80 likewise is in a transmission control member neutral position at this time.

Rotating actuating component 118 clockwise from the position shown in FIG. 4(A) against the biasing force of the biasing component 232 in assist mechanism 14 causes abutments 216b on actuating component 118 to contact abutments 188b on intermediate member stopper 188 as shown in FIG. 4(B). Intermediate member 114 remains stationary at this time. In FIG. 4(B), actuating component 118 is in an actuating component downshift position, and inner wire 80 is pulled into a transmission control member downshift position.

Rotating actuating component 118 counterclockwise from the position shown in FIG. 4(A) causes intermediate member 114 to rotate counterclockwise (to the left in FIG. 4(C)) against the biasing force of spring 110, since abutments 216a contact abutments 188a of intermediate member stoppers 188 and spring 110 is ultimately coupled between actuating component 118 and base member 102. As a result, actuating component 118 is in an actuating component upshift position, and inner wire 80 is released into a transmission control member upshift position.

Figure 5:
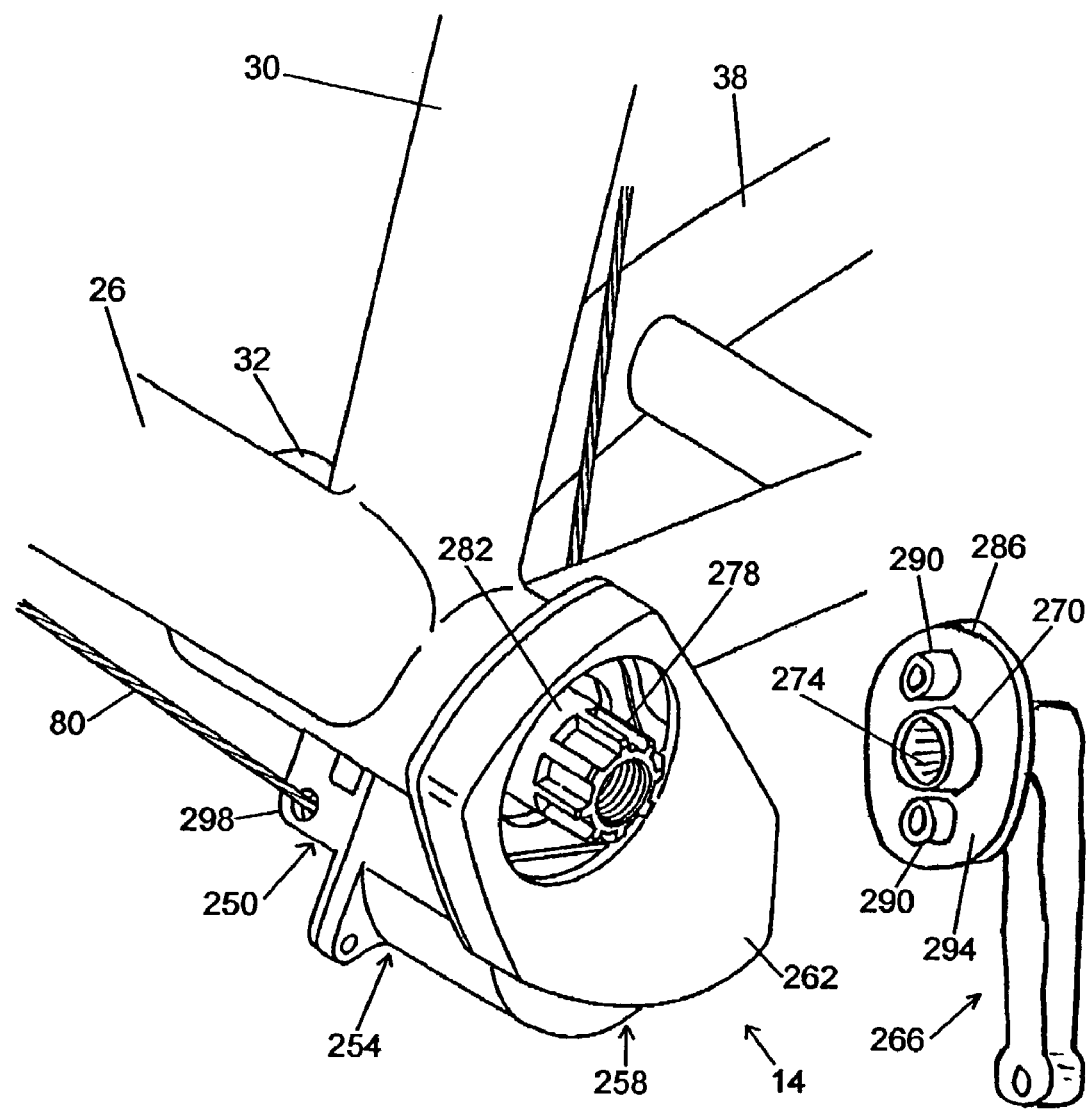
FIG. 5 is a closer view of the assist mechanism shown in FIG. 1.

FIG. 5 is a more detailed view of assist mechanism 14. As shown in FIG. 5, assist mechanism 14 is mounted to bottom bracket 32, and it includes an input unit 250, a positioning unit 254, and a rotating member engaging unit 258 with a cover 262. In this embodiment, assist mechanism 14 is used in conjunction with a crank arm 266 that includes an axle mounting boss 270 having a plurality of crank arm splines 274 that nonrotatably engage a plurality of axle splines 278 formed on the end of an axle 282 that is rotatably supported by bottom bracket 32 in a well known manner. A drive flange 286 extends radially outwardly from axle mounting boss 270 and supports a pair of diametrically opposed rotating members in the form of drive members 290. Drive members 290 have the shape of circular tubes that extend perpendicularly from the side surface 294 of drive flange 286.

Figure 6:
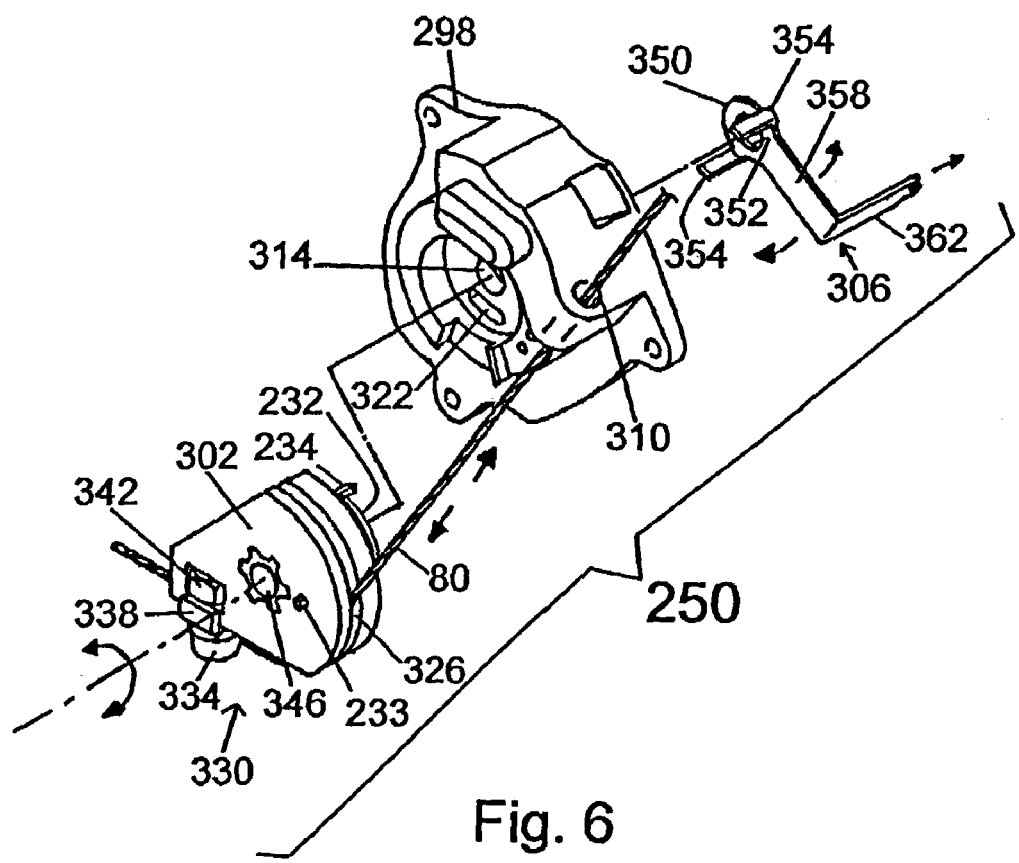
FIG. 6 is an exploded view of a particular embodiment of an input unit according to the present invention.

FIG. 6 is an exploded view of a particular embodiment of input unit 250. Input unit 250 includes an input unit mounting member 298, a wire coupling member 302, spring 232, and an input link 306. Input unit mounting member 298 has a guide channel 310 for inner wire 80, a central axle opening 314 for receiving an axle 318 (FIG. 10) of positioning unit 254 therethrough, and a pair of diametrically opposed openings 322 (only one opening is visible in FIG. 6). Wire coupling member 302 includes a wire winding groove 326 for winding and unwinding inner wire 80, a conventional wire coupler 330 in the form of a screw 334, a wire retainer 338 and a nut 342 for fixing inner wire 80 to wire coupling member 302, and an axle opening 346 for receiving axle 318 of positioning unit 254. Input link 306 functions to communicate the rotational position of wire coupling member 302 to positioning unit 254, and it includes an axle mounting portion 350 with an axle receiving opening 352, coupling tabs 354, a radially extending portion 358, and an axially extending coupling portion 362. Coupling tabs 354 extend axially from axle mounting portion 350, through openings 322 in input unit mounting member 298, and into corresponding openings (not shown) in wire coupling member 302 so that wire coupling member 302 and input link 306 rotate as a unit. Thus, both wire coupling member 302 and input link 306 will assume neutral, upshift and downshift positions corresponding to the positions of actuating component 118 of shift control device 84. Spring 232 has one end 233 mounted to wire coupling member 302 and another end 234 mounted to input unit mounting member 298 so that wire coupling member 302 and input link 306 are biased in the clockwise (wire winding) direction.

Figure 7:
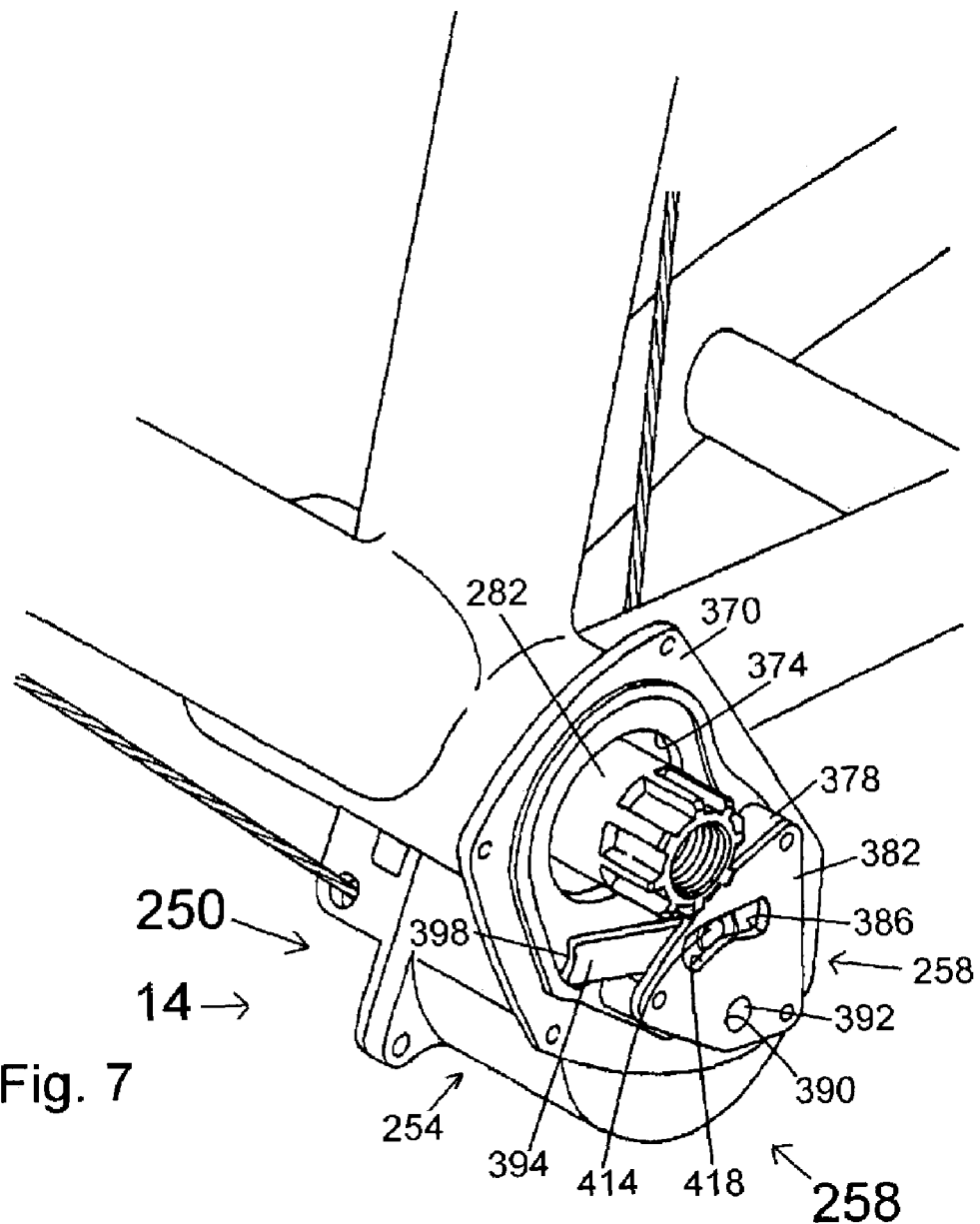
FIG. 7 is a view of the assist mechanism showing a particular embodiment of a rotating member engaging unit.
Figure 8:
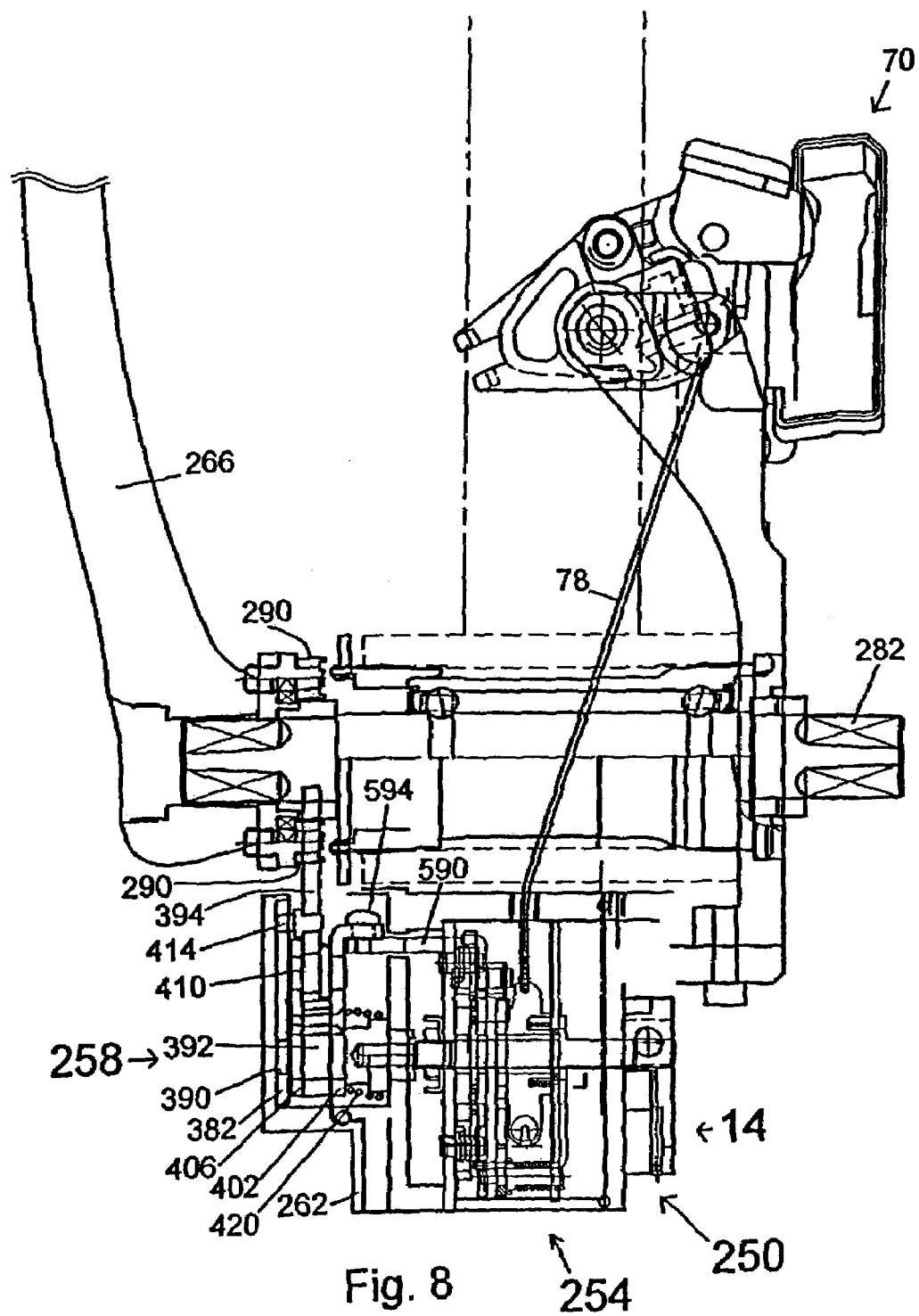
FIG. 8 is a rear cross sectional view of the assist mechanism.
Figure 9A:
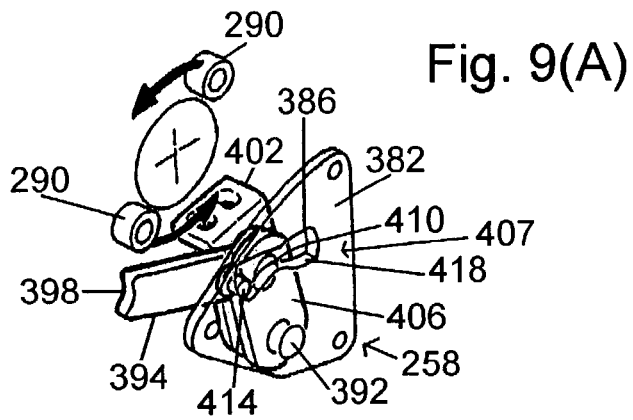
FIGS. 9(A)–9(D) illustrate the operation of the rotating member engaging member.

FIG. 7 is an oblique view of assist mechanism 14 with cover 262 of rotating member engaging unit 258 removed, FIG. 8 is a rear cross sectional view of assist mechanism 14, and FIGS. 9(A)–9(D) illustrate the operation of rotating member engaging unit 258. As shown in FIGS. 7, 8 and 9(A), rotating member engaging unit 258 includes a bottom bracket mounting member 370 (FIG. 7) with an opening 374 for receiving axle 282 therethrough, an axially extending side wall 378, a cam plate 382 with a control cam slot 386 attached to side wall 378, and an opening 390 for supporting a lower pivot shaft 392. A first end portion 391 (FIG. 21) of a rotating member engaging member 394, having the shape of a lever in this embodiment, has an arcuate rotating member engaging surface 398 for engaging drive members 290 on crank arm 266. A second end portion 392 (FIG. 21) of rotating member engaging member 394 is pivotably connected between a positioning unit interface plate 402 and a support plate 406 (which function as power communicating members) by a pivot shaft 410 (FIGS. 8 and 9(A)), thus forming a rotating member engaging link. A cam follower 414 is disposed between the first end portion and the second end portion of rotating member engaging member 394, and more specifically in close proximity to pivot shaft 410. Cam follower 414 engages a control cam surface 418 formed by cam slot 386. A spring 420 (FIG. 8) biases positioning unit interface plate 402 and support plate 406 in a counterclockwise direction. In this embodiment, positioning unit interface plate 402, support plate 406, cam follower 414 and control cam surface 418 can be considered a setting mechanism 407 that sets rotating member engaging member 394 in a rotating member engaging position and resets rotating member engaging member 394 back toward a rotating member disengaging position. Of course, many structures may be assembled to produce an appropriate setting mechanism. Also, while cam follower 414 was disposed on rotating member engaging member 394, a cam follower may be disposed at slot 386, and the control cam may be disposed on rotating member engaging member 394.

Figure 9B:
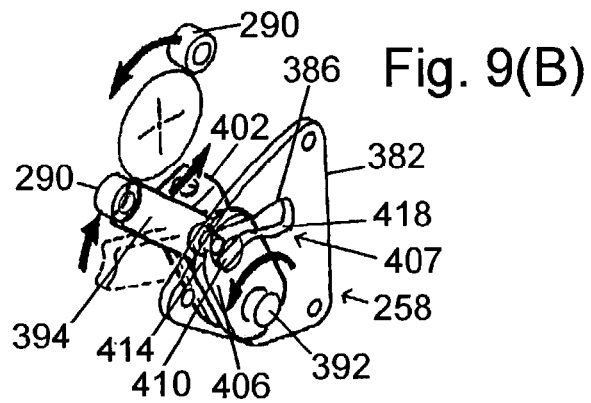
Figure 9C:
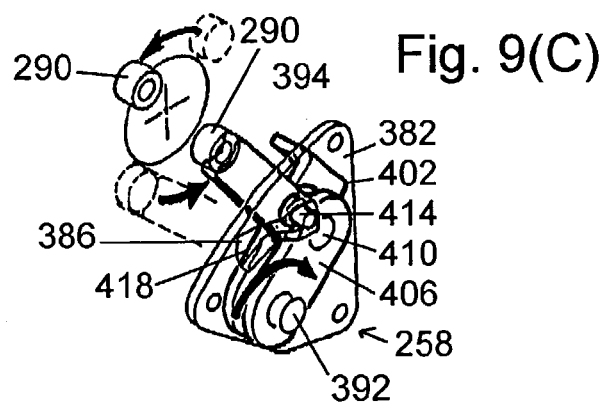
Figure 9D:
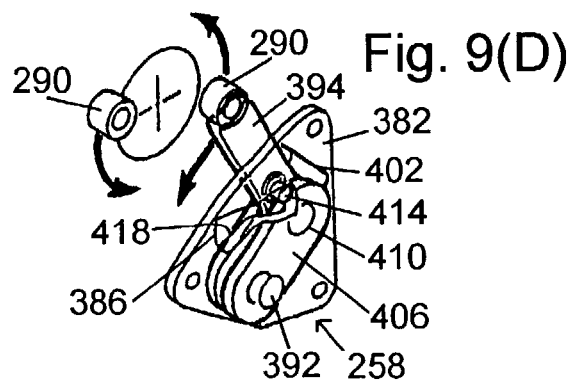

FIG. 9(A) shows rotating member engaging member 394 in the rotating member disengaging position, wherein drive members 290 rotate with crank arm 266 without causing any effect on assist mechanism 14. In general, when actuating component 118 of shift control unit 84 is rotated to either the upshift position or the downshift position, then positioning unit interface plate 402 and support plate 406 pivot counterclockwise as shown in FIG. 9(B). This causes rotating member engaging member 394 to pivot clockwise around pivot shaft 410, since cam follower 414 is retained within cam slot 386, to the rotating member engaging position shown in FIG. 9(B). In this position, rotating member engaging surface 398 is disposed in the path of drive members 290, so one of the drive members 290 will contact rotating member engaging surface 398 as shown in FIG. 9(B) and cause rotating member engaging member 394 to rotate positioning unit interface plate 402 and support plate 406 clockwise against the biasing force of spring 420 as shown in FIG. 9(C). As crank arm 266 continues to rotate, the engaged drive member 290 will disengage from rotating member engaging member 394, rotating member engaging member 394 will pivot counterclockwise as shown in FIG. 9(D) back to the rotating member disengaging position, and spring 420 will cause positioning unit interface plate 402 and support plate 406 to pivot counterclockwise back to the position shown in FIG. 9(A).

Figure 10:
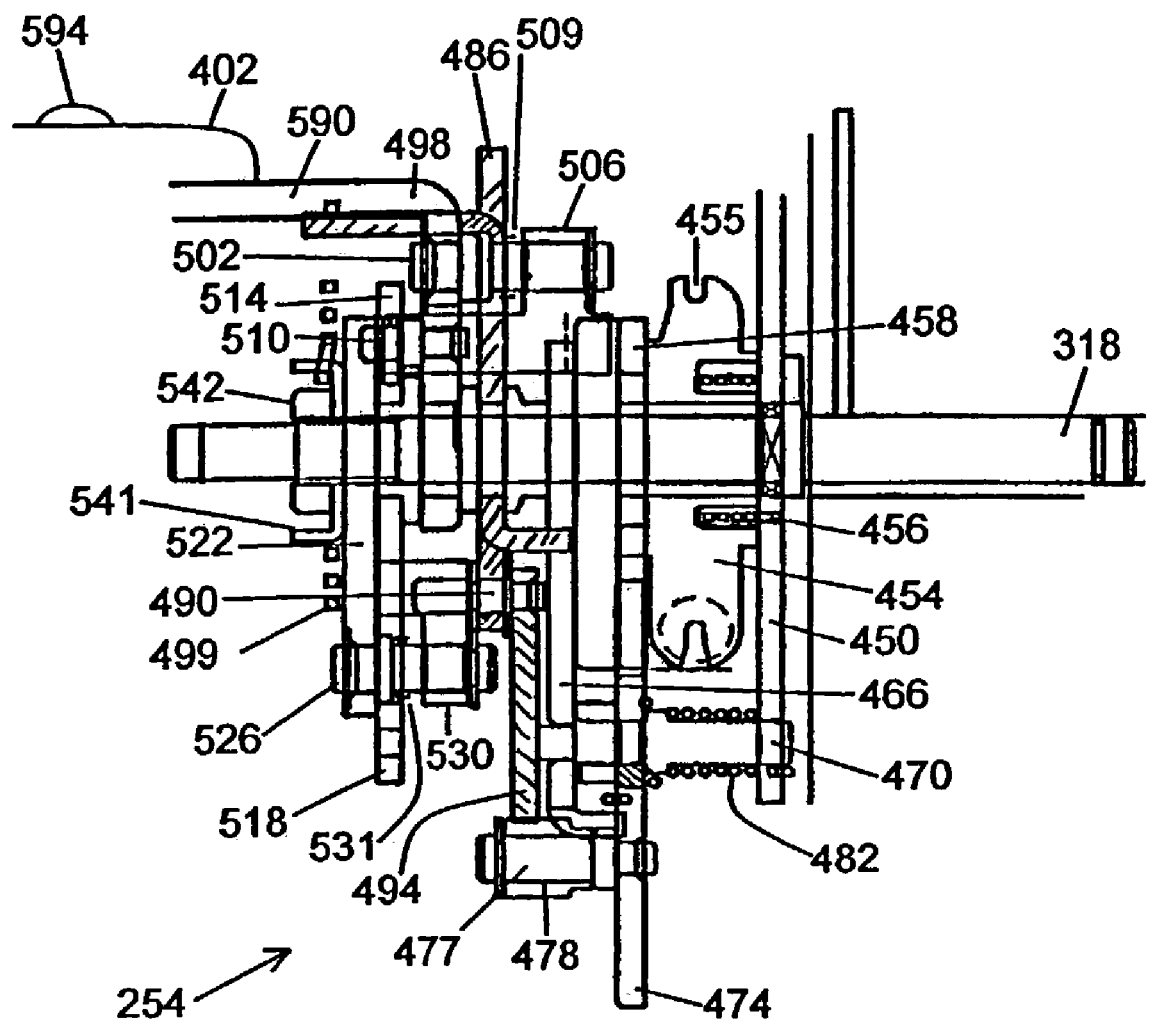
FIG. 10 is an enlarged cross sectional view of the internal components of the positioning unit shown in FIG. 8.

FIG. 10 is an enlarged rear cross sectional view of the internal components of positioning unit 254, and FIG. 16(A) is a side view of some of the internal components of positioning unit 254. As shown in FIG. 10, positioning unit 254 includes a base plate 450 supporting one end of a pawl shaft 470; an output transmission member in the form of a rotating member 454 rotatably supported on axle 318 and having a wire winding groove 455 for winding and unwinding output control wire 78 to a plurality of output positions; a biasing component in the form of a spring 456 for biasing rotating member 454 in a wire unwinding direction; a positioning member in the form of a positioning ratchet 458 coupled for integral rotation with rotating member 454; a middle plate 466 supporting the other end of pawl shaft 470; a position maintaining member in the form of a positioning pawl 474 supported by pawl shaft 470 for rotation between a position maintaining position and a position release position and having positioning teeth 475 and 476 (FIG. 16(A)); a pivot shaft 477 mounted to positioning tooth 475; a cam follower in the form of a cam roller 478 rotatably supported by pivot shaft 477; and a pawl spring 482 connected between positioning pawl 474 and base plate 450 for biasing positioning pawl 474 toward the position maintaining position (counterclockwise in FIG. 16(A)).

Positioning unit 254 further includes a release plate 486 rotatably supported on axle 318 and having a pivot shaft 490 supporting a cam member in the form of a cam plate 494; a motion transmitting member 498 rotatably supported on axle 318; a pawl shaft 502 mounted to motion transmitting member 498; a motion transmitting pawl 506 pivotably supported on pawl shaft 502; a spring 509 for biasing motion transmitting pawl 506 in the counterclockwise direction in FIG. 16(A); another pawl shaft 510 mounted to motion transmitting member 498; a mode change pawl 514 pivotably supported on pawl shaft 510; an input transmission member in the form of a control plate 518 rotatably supported on axle 318; a base plate 522; a pawl shaft 526 mounted to base plate 522 and supporting a switch-off drive control member in the form of a drive control pawl 530; a spring 531 for biasing drive control pawl 530 in the counterclockwise direction in FIG. 16(A); a pawl shaft 534 (FIG. 16(A)) mounted to base plate 522 and supporting a switch-on drive control member in the form of a drive control pawl 538; a spring 539 for biasing drive control pawl 538 in the counterclockwise direction in FIG. 16(A); a spring retainer 541; a spring 499 connected between spring retainer 541 and motion transmitting member 498 for biasing motion transmitting member 498 in the clockwise direction in FIG. 16(A), and a retaining nut 542 for axially retaining the components on axle 318. Base plate 450, base plate 522 and axle 318 function as mounting units for the various components.

Figure 11:
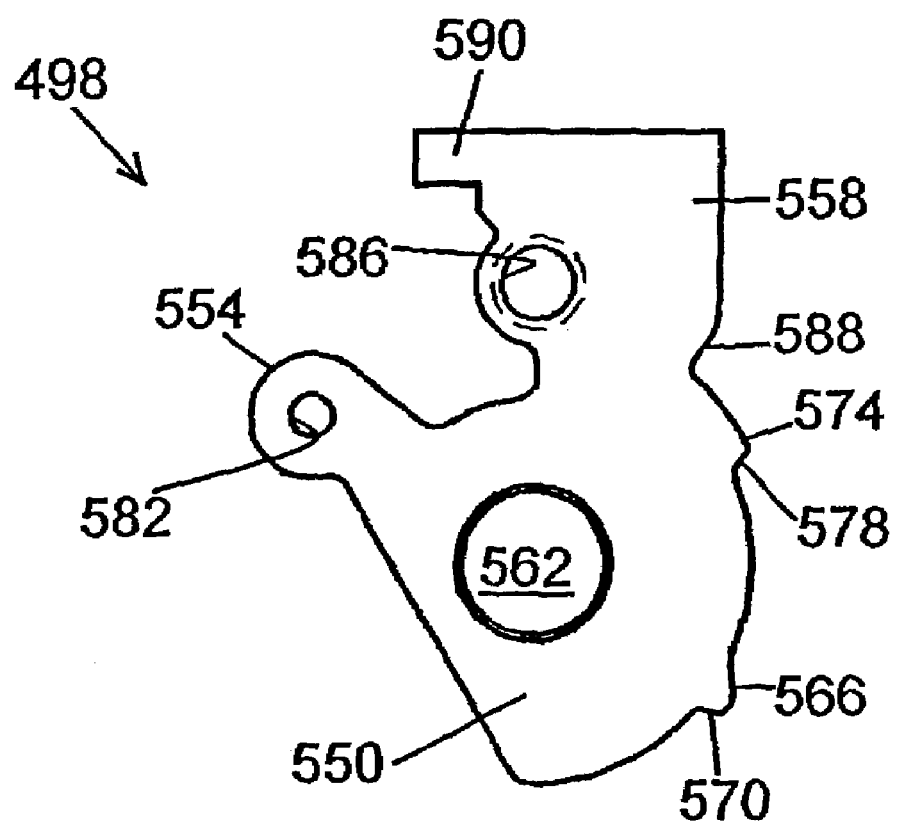
FIG. 11 is a side view of a particular embodiment of a motion transmitting member according to the present invention.

FIG. 11 is a side view of motion transmitting member 498. Motion transmitting member 498 includes a base portion 550, a pawl mounting ear 554 and a motion transmitting arm 558. Base portion 550 includes an opening 562 for receiving axle 318 therethrough, a radially outwardly extending projection 566 forming an abutment 570 for contacting drive control pawl 530, and a radially outwardly extending projection 574 forming an abutment 578 for contacting drive control pawl 538. Pawl mounting ear 554 includes an opening 582 for mounting pawl shaft 510 (which supports mode change pawl 514), and motion transmitting arm 558 likewise includes an opening 586 for mounting pawl shaft 502 (which supports motion transmitting pawl 506). Motion transmitting arm 558 also includes an abutment 588 for contacting drive control pawl 538, and an axially extending rotating member engaging unit interface plate 590 that attaches to positioning unit interface plate 402 through screws 594 as shown in FIGS. 8 and 10.

Figure 12:
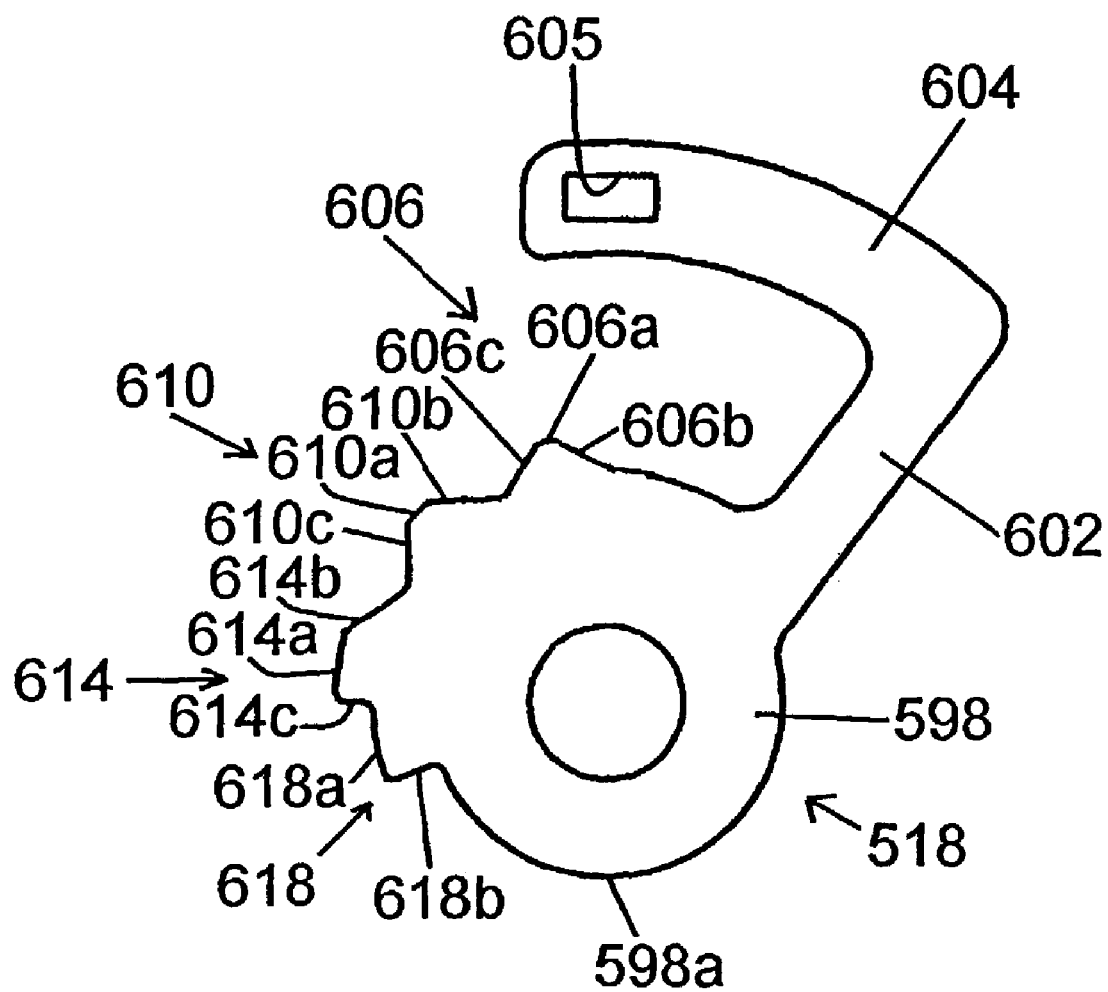
FIG. 12 is a side view of a particular embodiment of an input transmission member according to the present invention.

FIG. 12 is a side view of a particular embodiment of control plate 518. Control plate 518 includes an input control member in the form of a base portion 598, a lever arm portion 602, and an input unit interface plate 604. Input unit interface plate 604 includes an opening 605 for receiving coupling portion 362 (FIG. 6) of input link 306. Base portion 598 includes input control members in the form of radially extending drive control cam surfaces or lobes 606, 610, 614 and 618. Drive control cam lobe 606 includes an upper surface 606a and inclined ramps 606b and 606c. Similarly, cam lobe 610 includes an upper surface 610a and inclined ramps 610b and 610c. Cam lobe 614 includes an upper surface 614a, an inclined ramp 614b and a transition surface 614c extending from upper surface 614a to an upper surface 618a of cam lobe 618. Cam lobe 618 further includes a transition surface 618b extending from upper surface 618a to the outer peripheral surface 598a of base portion 598. It will become apparent from the description below that cam lobes 606, 610, 614 and 618, drive control pawl 538 and motion transmitting member 498 with projection 578 comprise a switching mechanism to control the movement of rotating member engaging member 394 between the rotating member engaging position and the rotating member disengaging position.

Figure 13:
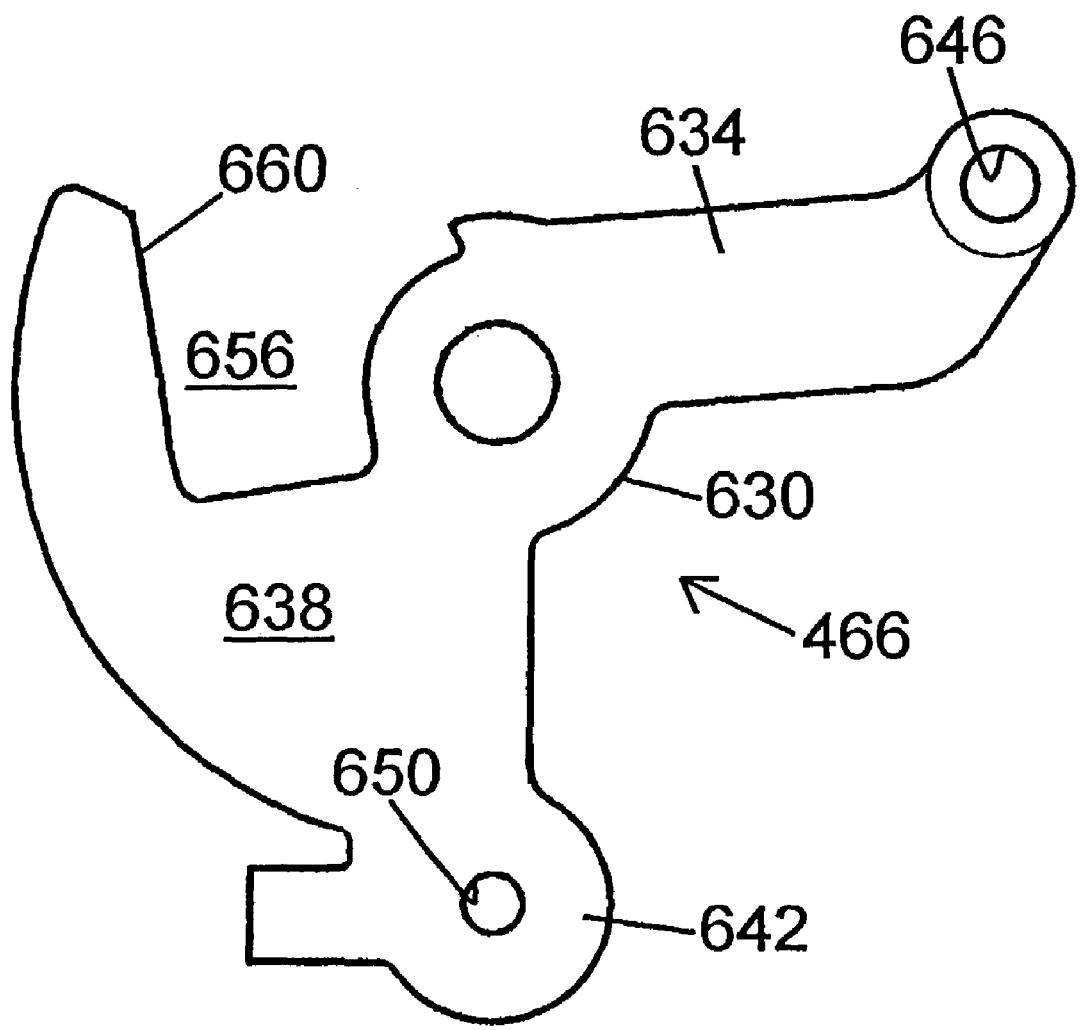
FIG. 13 is a side view of a particular embodiment of a middle plate according to the present invention.

FIG. 13 is a side view of a particular embodiment of middle plate 466. Middle plate 466 includes a base portion 630, a pawl coupling arm 634, a downshift control plate 638, and a pawl coupling portion 642 extending from downshift control plate 638. Pawl coupling arm 634 includes an opening 646 for receiving a fastener (not shown) used to attach the assembly to the housing, and pawl coupling portion 642 includes an opening 650 for attaching pawl shaft 470 (which supports positioning pawl 474). Downshift control plate 638 defines a recess 656 having a pawl control surface 660 that functions in a manner described below.

Figure 14:
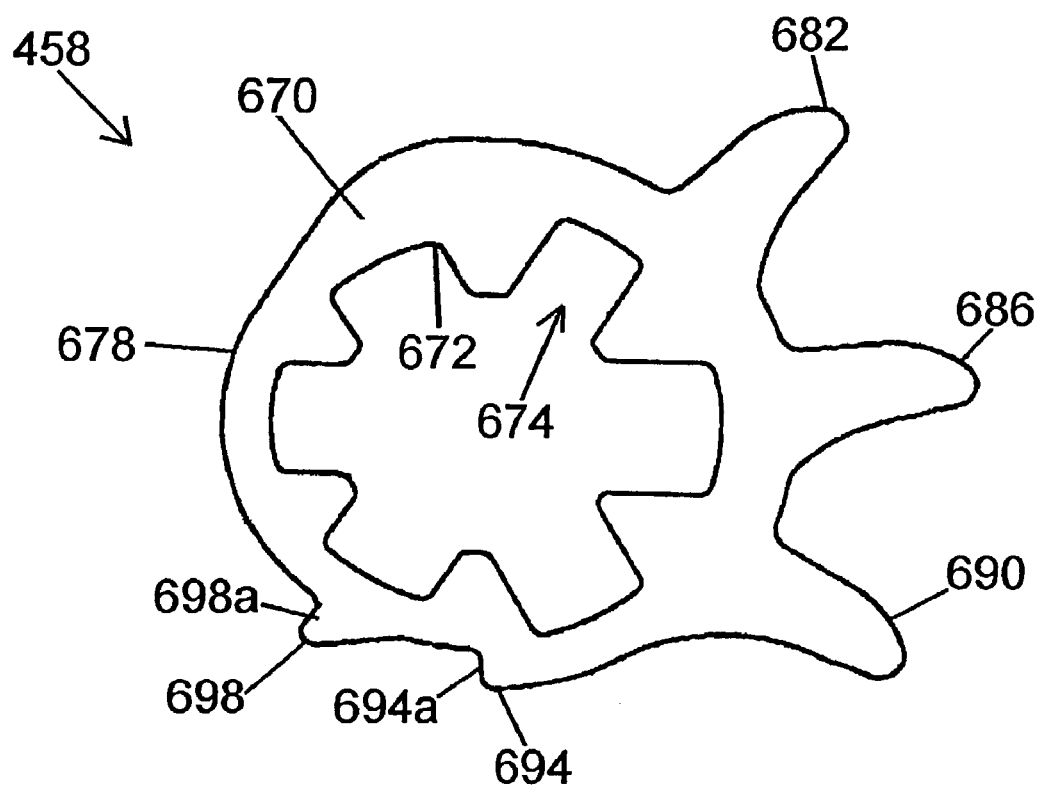
FIG. 14 is a side view of a particular embodiment of a positioning member according to the present invention.

FIG. 14 is a side view of positioning ratchet 458. Positioning ratchet 458 comprises a generally annular body 670 having an inner peripheral surface 672 forming a plurality of female splines 674 that nonrotatably engage a corresponding plurality of male splines (not shown) formed on rotating member 454 so that positioning ratchet 458 and rotating member 454 rotate as a unit. An outer peripheral surface 678 forms three positioning teeth 682, 686 and 690 and two drive teeth 694 and 698 defining drive surfaces 694a and 698a, respectively. With this structure, rotating member 454 can be set in three positions to accommodate three front sprockets 62. Such sprockets usually comprise a small diameter sprocket, an intermediate diameter sprocket, and a large diameter sprocket.

Figure 15:
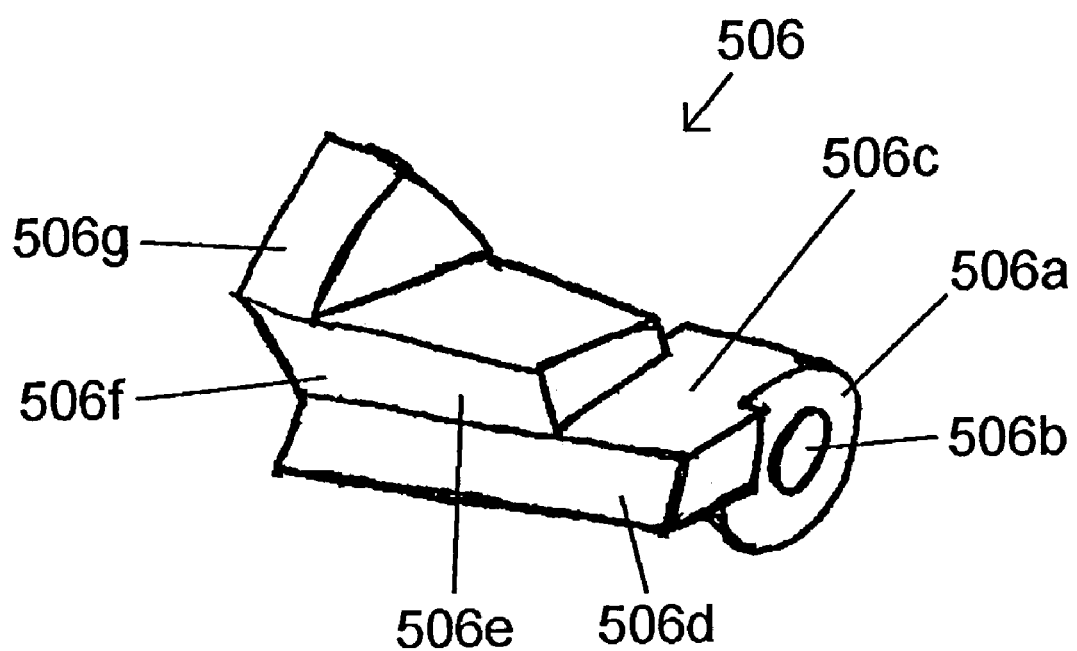
FIG. 15 is a perspective view of a particular embodiment of a motion transmitting pawl according to the present invention.

FIG. 15 is a perspective view of motion transmitting pawl 506. Motion transmitting pawl 506 includes a base portion 506a with an opening 506b for receiving pawl shaft 502, a downshift control surface 506c for contacting pawl control surface 660 of middle plate 466 in a manner described below, a positioning ratchet drive surface 506d, a release plate drive surface 506e, and mode change pawl contact surfaces 506f and 506g.

FIGS. 16(A)–(E) are views illustrating the operation of positioning unit 254 in an upshifting direction. In FIG. 16(A), positioning unit 254 is in a position such that front derailleur 70 is aligned with the small diameter front sprocket, and it is desired to move front derailleur 70 to the intermediate diameter front sprocket. In the position shown in FIG. 16(A), the tip of drive control pawl 530 is supported by the upper surface 606a of cam lobe 606, and the tip of drive control pawl 538 is located at the bottom of ramp 610c of cam lobe 610 such that drive control pawl 538 contacts abutment 578 on motion transmitting member 498 and holds motion transmitting member 498 in a "switch off" position. Thus, drive control pawl 538 and cam lobe 610 comprise a drive control mechanism that ordinarily maintains motion transmitting member 498 in the switch off position. Motion transmitting pawl 506 rests on the upper surface of drive tooth 694 on positioning ratchet 458.

The rider then rotates actuating component 118 counterclockwise (in FIG. 3) to the upshift position so that inner wire 80 is released by actuating component 118. This causes wire coupling member 302 to rotate clockwise in FIG. 6, and this motion is communicated via input link 306 to control plate 518 to rotate control plate 518 clockwise to the upshift position shown in FIG. 16(B). Clockwise rotation of control plate 518 causes drive control pawl 530 to slide down ramp 606c of cam lobe 606 and rotate counterclockwise to the position shown in FIG. 16(B). At the same time, drive control pawl 538 slides up ramp 614b of cam lobe 614 until drive control pawl 538 disengages from abutment 578 on motion transmitting member 498 and rests on upper surface 614a of cam lobe 614. Since drive control pawl 538 no longer contacts abutment 578, motion transmitting member 498 rotates clockwise until drive control pawl 538 contacts abutment 588, and motion transmitting member 498 is in a "switch on" position as shown in FIG. 16(B). Motion transmitting pawl 506, no longer being held by drive tooth 694 on positioning ratchet 458, rotates counterclockwise and rests on the outer peripheral surface 678 of positioning ratchet 458. The clockwise motion of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement is communicated to motion transmitting member 498. Positioning ratchet drive surface 506d of motion transmitting pawl 506 engages drive tooth 694 on positioning ratchet 458 and rotates positioning ratchet 458 and rotating member 454 to wind output control wire 78. During that time, positioning tooth 682 presses against pawl tooth 475 of positioning pawl 474 and rotates positioning pawl 474 clockwise until pawl tooth 475 clears the tip of positioning tooth 682. Then, positioning pawl 474 rotates counterclockwise so that pawl tooth 475 is located between positioning teeth 682 and 686 shown in FIG. 16(C).

When drive member 290 on crank arm 266 disengages from rotating member engaging member 394, positioning unit interface plate 402 and support plate 406 rotate back toward the position shown in FIG. 9(A), and this movement is communicated to motion transmitting member 498. Motion transmitting pawl 506 disengages from drive tooth 694 on positioning ratchet 458, and positioning ratchet 458 and rotating member 454 rotate clockwise in accordance with the biasing force of spring 456 until positioning tooth 682 abuts against pawl tooth 475. At this time, the front derailleur 70 is aligned with the intermediate diameter front sprocket as desired.

Assume, however, that at this time the rider has not yet rotated actuating component 118 back to the neutral position. In such a case, control plate 518 still would be in the upshift position with drive control pawl 538 resting on upper surface 614a of cam lobe 614. In this position, drive control pawl 538 would not be able to engage abutment 578 to stop the rotation of motion transmitting member 498. Thus, instead of returning to the switch off position shown in FIG. 16(A), motion transmitting member 498 would continue rotating to the switch on position shown in FIG. 16(B), rotating member engaging member 394 would return to the rotating member engaging position shown in FIG. 9(B), and another shift would result. Such an operation may be desirable in some applications and is within the scope of the present invention. However, in this embodiment drive control pawl 530 is provided to prevent such double shifts. More specifically, drive control pawl 530, having rotated counterclockwise as noted above, is now in the position to contact abutment 570 on motion transmitting member 498 and temporarily stop further rotation of motion transmitting member 498 so that motion transmitting member 498 is in the position shown in FIG. 16(D). Thus, drive control pawl 530 and cam lobe 606 comprise a drive control mechanism that inhibits rotation of motion transmitting member 498 back to the switch on position after the motion transmitting mechanism transmits motion from the rotating member engaging member 394 to rotating member 454.

When the rider returns actuating component 118 to the neutral position, control plate 518 likewise rotates back to the neutral position shown in FIG. 16(E). At that time, drive control pawl 530 slides up ramp 606c on cam lobe 606 and rotates clockwise until control pawl 530 disengages from abutment 570 on motion transmitting member 498 and the tip of control pawl 530 rests upon the upper surface 606a of cam lobe 606. Also, drive control pawl 538 slides down ramp 614b of cam lobe 614 and rotates counterclockwise so that the tip of drive control pawl 538 contacts abutment 578 on motion transmitting member 498 as shown in FIG. 16(E). Motion transmitting member 498 is now in the switch off position as shown originally in FIG. 16(A), but with positioning ratchet 458 and rotating member 454 in the position to align front derailleur 70 with the intermediate diameter front sprocket. The operation to shift from the intermediate diameter front sprocket to the large diameter front sprocket is the same.

FIGS. 17(A)–(E) are views illustrating the operation of positioning unit 254 in a downshifting direction. Some components are shown in transparent view to facilitate understanding of the operation of the components that play an important role in the downshift operation. Assume rotating member 454 is in a position such that front derailleur 70 is aligned with the intermediate diameter front sprocket (the same position shown in FIG. 16(E)), and it is desired to move front derailleur 70 to the small diameter sprocket. Accordingly, in the position shown in FIG. 17(A), the tip of drive control pawl 530 again is supported by the upper surface 606a of cam lobe 606, and the tip of drive control pawl 538 is located at the bottom of ramp 610c of cam lobe 610 such that drive control pawl 538 contacts abutment 578 on motion transmitting member 498. Motion transmitting pawl 506 rests on the upper surface of drive tooth 698 on positioning ratchet 458. Cam plate 494, which has the overall shape of a rounded and elongated isosceles triangle, includes an axially extending positioning tab 495 that abuts against a side surface 487 of release plate 486 to hold cam plate 494 in the position shown in FIG. 17(A).

The rider then rotates actuating component 118 clockwise (in FIG. 3) to the downshift position so that inner wire 80 is pulled by actuating component 118. This causes wire coupling member 302 to rotate counterclockwise in FIG. 6, and this motion is communicated via input link 306 to control plate 518 to rotate control plate 518 counterclockwise as show in FIG. 17(B). Counterclockwise rotation of control plate 518 causes drive control pawl 530 to slide down ramp 606b of cam lobe 606 and rotate counterclockwise. At the same time, drive control pawl 538 slides up ramp 610c of cam lobe 610 and rotates clockwise until drive control pawl 538 disengages from abutment 578 on motion transmitting member 498 and rests on upper surface 610a of cam lobe 610. Since drive control pawl 538 no longer contacts abutment 578, motion transmitting member 498 rotates clockwise until drive control pawl 538 contacts abutment 588 and motion transmitting member 498 is in the switch on position shown in FIG. 17(B). This time, motion transmitting pawl 506 rotates clockwise by transition surface 618b of cam lobe 618, and mode change pawl 514 rotates clockwise to engage mode change pawl contact surface 506f on motion transmitting pawl 506 to temporarily hold motion transmitting pawl 506 in the position shown in FIG. 17(B). The movement of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement again is communicated to motion transmitting member 498, but this time release plate drive surface 506e of motion transmitting pawl 506 engages an abutment 487 on release plate 486 (which is currently in a first release member position), and release plate 486 rotates counterclockwise as shown in FIG. 17(C). Thus, motion transmitting member 498 functions as a release drive member for release plate 486 in this mode. As release plate 486 rotates, a base surface 496 of cam plate 494 contacts cam roller 478 attached to positioning pawl 474 and causes positioning pawl 474 to rotate in the clockwise direction. When the tip of pawl tooth 475 clears the tip of positioning tooth 682, positioning ratchet 458 and rotating member 454 rotate in the clockwise direction in accordance with the biasing force of spring 456 until positioning tooth 686 abuts against pawl tooth 476 to prevent uncontrolled rotation of positioning ratchet 458 and rotating member 454.

As release plate 486 continues to rotate counterclockwise toward a second release member position (the end of the range of motion of release plate 486), cam roller 478 reaches the rounded corner or cam lobe 497 of cam plate 494, thus causing cam plate 494 to rotate in the counterclockwise direction as shown in FIG. 17(C). This, in turn, allows positioning pawl 474 to rotate in the counterclockwise direction so that pawl tooth 476 moves away from positioning tooth 686 to allow positioning ratchet 458 and rotating member 454 to continue rotating in the clockwise direction until rotating member 454 is positioned so that front derailleur 70 is aligned with the smaller diameter sprocket.

If this system operated according to known systems which use a positioning pawl and positioning ratchet to control the shifting operation, the pawl tooth 476 would remain engaged with positioning tooth 686 until release plate 486 reversed direction (i.e., rotated in the clockwise direction) to complete the shifting operation. This is not necessary with a shift control mechanism constructed according to the present invention, since the rotatable cam plate 494 allows the positioning pawl 474 to immediately complete the shifting operation even when release plate 486 is still rotating in the counterclockwise direction. Thus, release plate 486 and cam plate 494 can be considered a release control mechanism that moves positioning pawl 474 to the position release position as release plate 486 moves toward the second release member position and allows positioning pawl 474 to return to the position maintaining position as release plate 486 continues to move toward the second release member position.

Figure 18A:
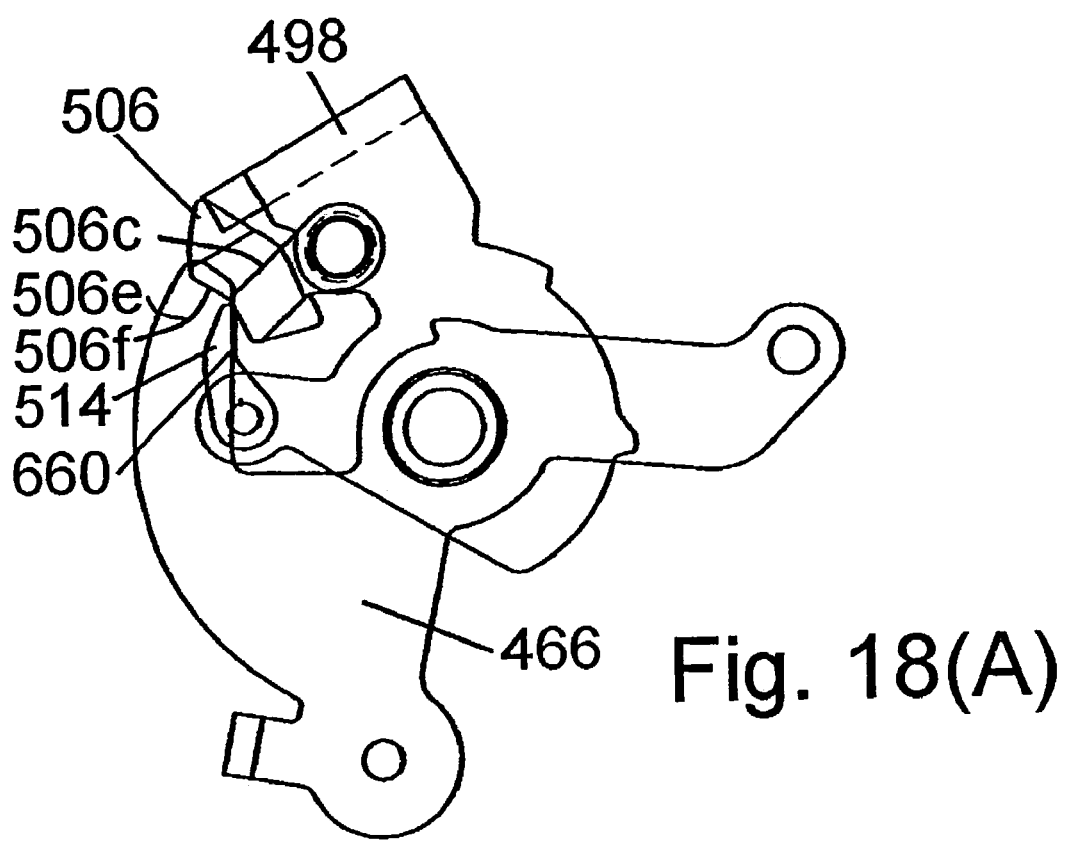
FIGS. 18(A) and 18(B) are views illustrating the cooperation of the motion transmitting pawl with the middle plate during a downshifting operation.
Figure 18B:
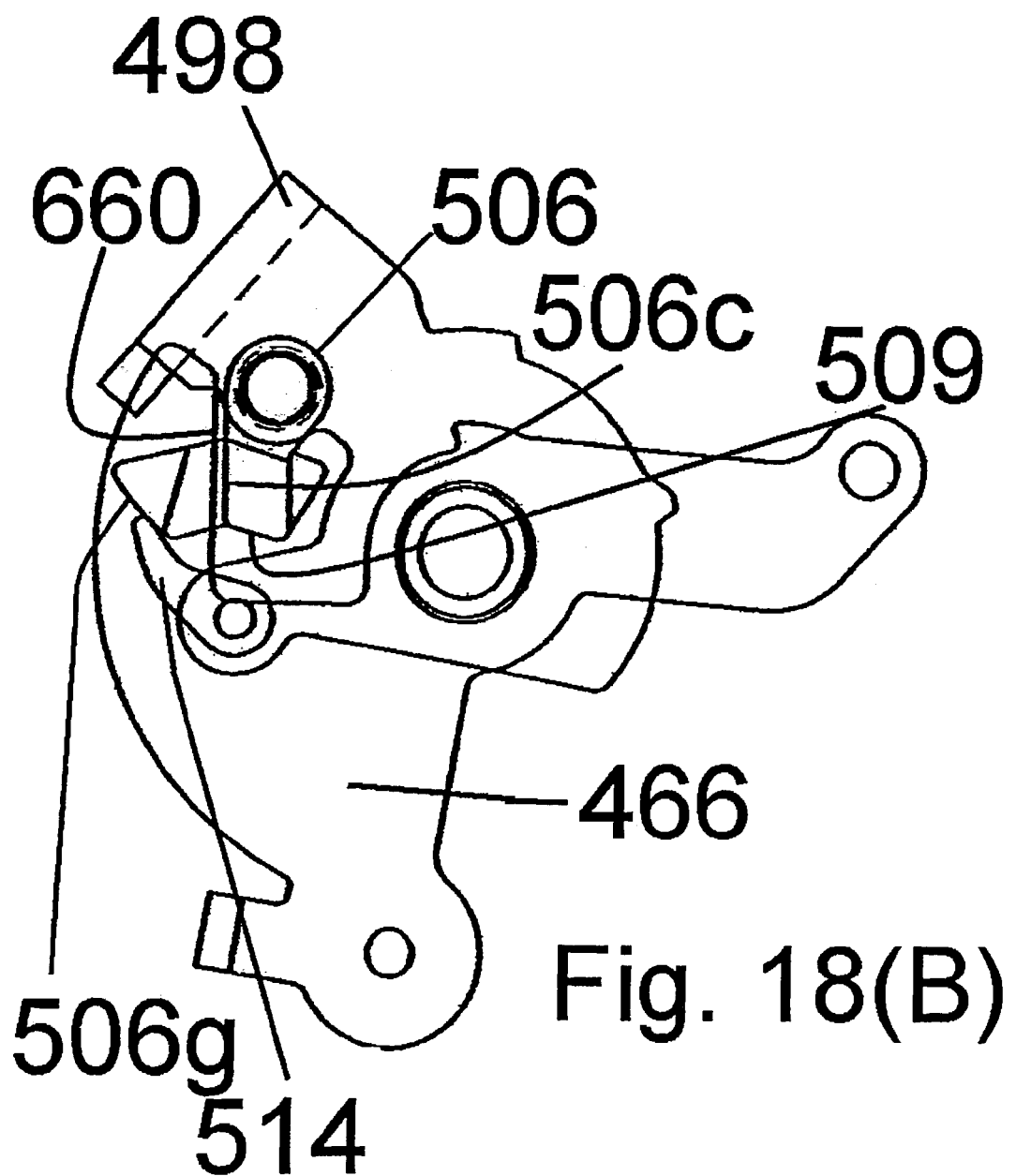

Another advantageous feature of the preferred embodiment is the manner in which the release plate 486 is allowed to reverse direction even when motion transmitting member 498 is still rotating in the counterclockwise direction. According to the preferred embodiment, when the motion transmitting member 498 is located in the position shown in FIGS. 17(C) and 18(A), downshift control surface 506c of motion transmitting pawl 506 begins to contact the pawl control surface 660 of middle plate 466 as shown in FIG. 18(A). Further rotation of motion transmitting member 498 causes motion transmitting pawl 506 to rotate counterclockwise as shown in FIGS. 17(D) and 18(B) which, in turn, causes motion transmitting pawl 506 to disengage from release plate 486. Mode change pawl 514 also disengages from mode change pawl contact surface 506f of motion transmitting pawl 506 and rests on mode change pawl contact surface 506g. Consequently, release plate 486 is allowed to return immediately to the position shown in FIG. 17(D), even when motion transmitting member 498 is still in the counterclockwise position shown in FIG. 17(D).

When drive member 290 on crank arm 266 disengages from rotating member engaging member 394, positioning unit interface plate 402 and support plate 406 again rotate back toward the position shown in FIG. 9(A), and this movement is communicated to motion transmitting member 498. Once again, assume that the rider has not yet rotated actuating component 118 back to the neutral position. In such a case, control plate 518 is still in the downshift position with drive control pawl 538 resting on upper surface 610a of cam lobe 610, but drive control pawl 530 contacts abutment 570 on motion transmitting member 498 so that motion transmitting member 498 is in the pause position shown in FIG. 17(E).

When the rider returns actuating component 118 to the neutral position, control plate 518 likewise rotates clockwise back to the neutral position shown in FIG. 17(F). At that time, drive control pawl 530 slides up ramp 606b of cam lobe 606 and rotates clockwise until drive control pawl 530 disengages from abutment 570 on motion transmitting member 498 and the tip of drive control pawl 530 rests upon upper surface 606a of cam lobe 606. At the same time, drive control pawl 538 slides down ramp 610c of cam lobe 610 and rotates counterclockwise so that the tip of drive control pawl 538 contacts abutment 578 on motion transmitting member 498 as shown in FIG. 17(F). Motion transmitting member 498 is now in the switch off position originally shown in FIG. 17(A), but positioning ratchet 458 and rotating member 454 are in the position to align front derailleur 70 with the small diameter front sprocket.

The operation to shift from the large diameter front sprocket to the intermediate diameter front sprocket is the same. However, in this case positioning ratchet 458 would be positioned initially such that pawl tooth 475 abuts against positioning tooth 686. As positioning pawl 474 rotates clockwise in response to pressure from cam plate 494, pawl tooth 475 clears positioning tooth 686, and positioning ratchet 458 rotates counterclockwise until positioning tooth 690 contacts pawl tooth 476. When positioning pawl 474 rotates counterclockwise as the cam lobe 497 of cam plate 494 reaches cam roller 478, pawl tooth 475 enters the space between positioning teeth 682 and 686, and pawl tooth 476 releases positioning tooth 690 so that positioning ratchet 458 and rotating member 454 rotate clockwise until positioning tooth 682 contacts pawl tooth 475, thus maintaining positioning ratchet 458 and rotatable member 454 in the position shown in FIG. 17(A).

Figure 19B:
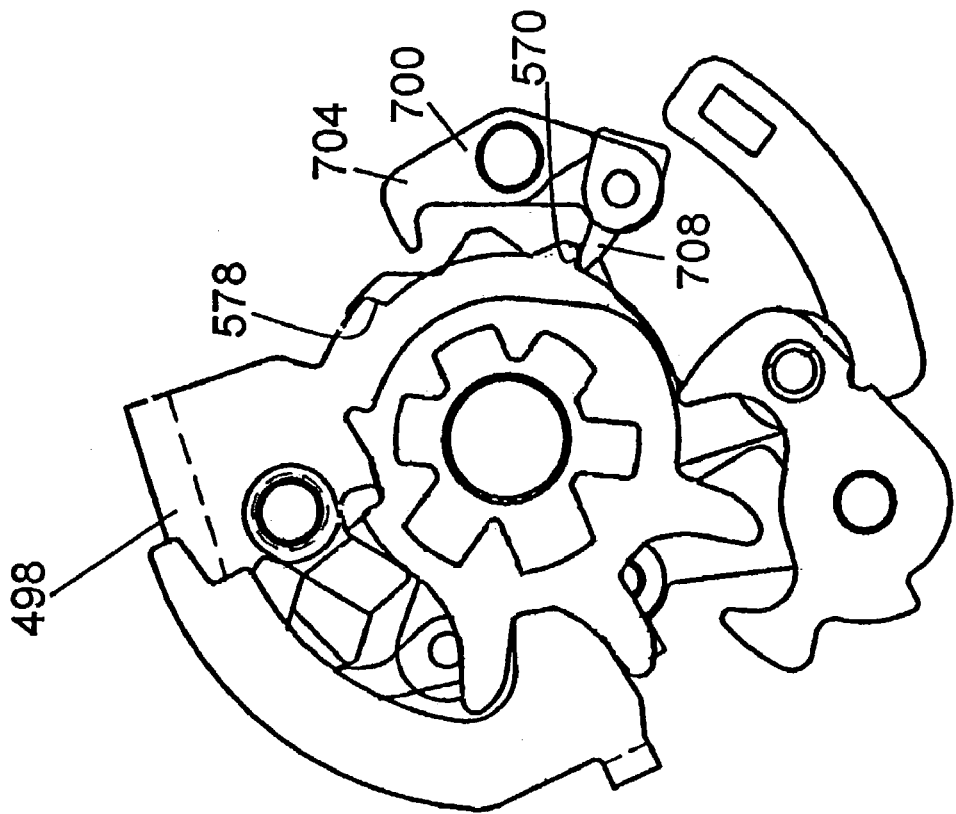
FIGS. 19(A) and 19(B) are views of an alternative embodiment of a drive control mechanism according to the present invention.
Figure 19A:
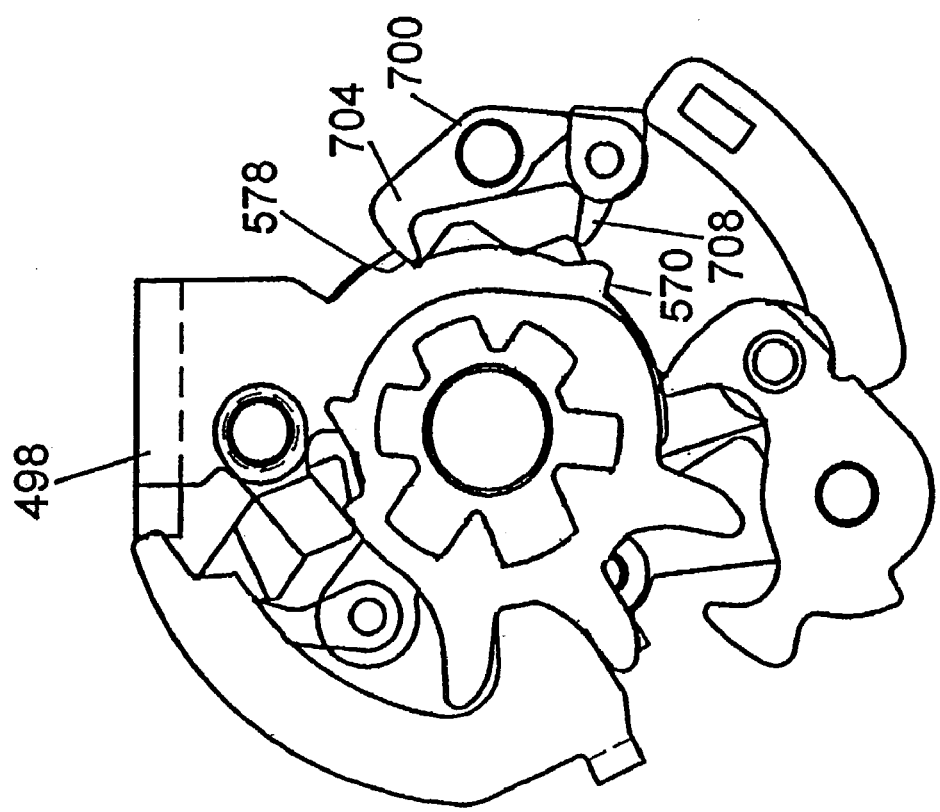

While separately operated drive control pawls 530 and 538 were provided in the preferred embodiment, the embodiment shown in FIGS. 19(A) and 19(B) show a single drive control pawl 700 with pawl teeth 704 and 708. Pawl tooth 704 contacts abutment 578 on motion transmitting member 498 when motion transmitting member 498 is in the home position as shown in FIG. 19(A). Pawl tooth 708 contacts abutment 570 on motion transmitting member 498 when motion transmitting member 498 is rotating clockwise to the switch off position and control plate 486 has not yet rotated to the neutral position as shown in FIG. 19(B).

Figure 20:
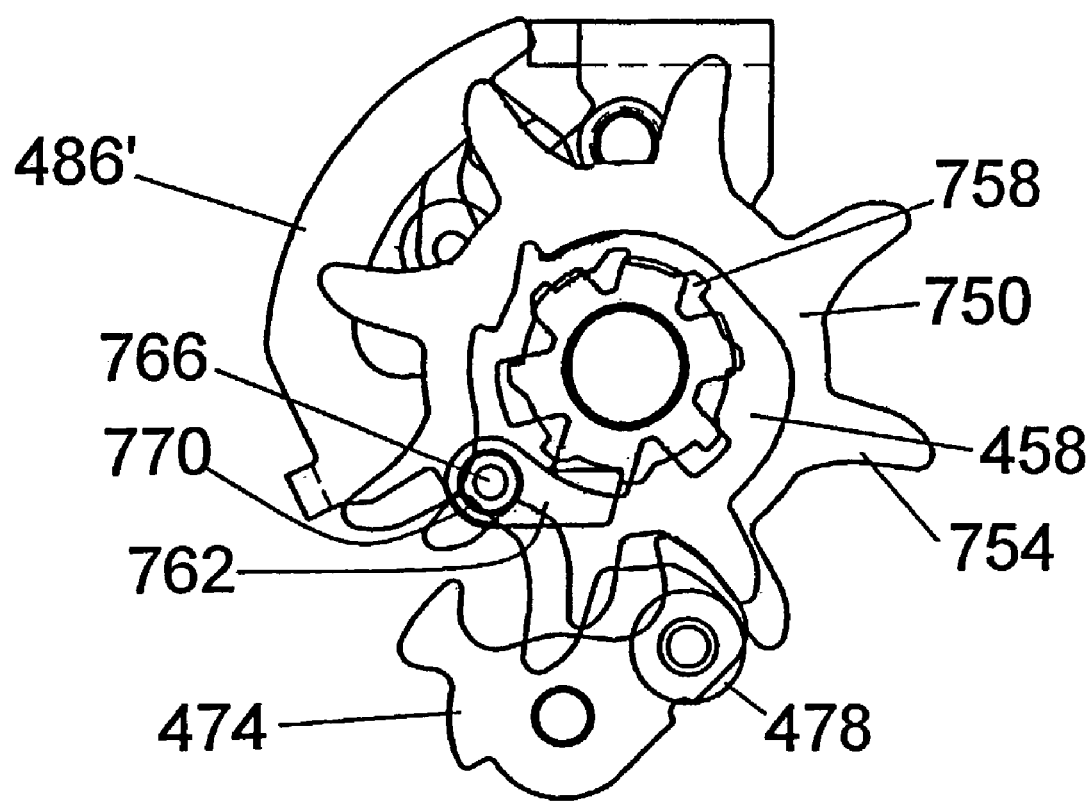
FIG. 20 is a side view of an alternative embodiment of a release mechanism according to the present invention.

While a cam plate 494 was used to control positioning pawl 474 in a downshifting operation in the preferred embodiment, FIG. 20 shows an embodiment wherein a cam wheel 750 controls the operation of positioning pawl 474. In this embodiment, cam wheel 750 is coaxially and rotatably mounted relative to positioning ratchet 458. Cam wheel 750 includes a plurality of circumferentially disposed cam teeth 754 and a plurality of circumferentially disposed cam drive teeth 758. A cam drive pawl 762 is pivotably mounted to a release plate 486' through a pivot shaft 766 and biased in a counterclockwise direction by a spring 770. When release plate 486' rotates in the counterclockwise direction during a downshift operation, cam drive pawl 762 engages one of the plurality of cam drive teeth 758 and rotates cam wheel 750 in the counterclockwise direction. One of the plurality of cam teeth 754 presses against cam roller 478 and causes positioning pawl 474 to rotate in the clockwise direction in the same manner as in the preferred embodiment. When the cam tooth 754 passes cam roller 478, positioning pawl 474 rotates in the counterclockwise direction to complete the downshift operation. Cam drive pawl 762 disengages from the corresponding cam drive tooth 758 when release plate 486' rotates in the clockwise direction.

Figure 21:
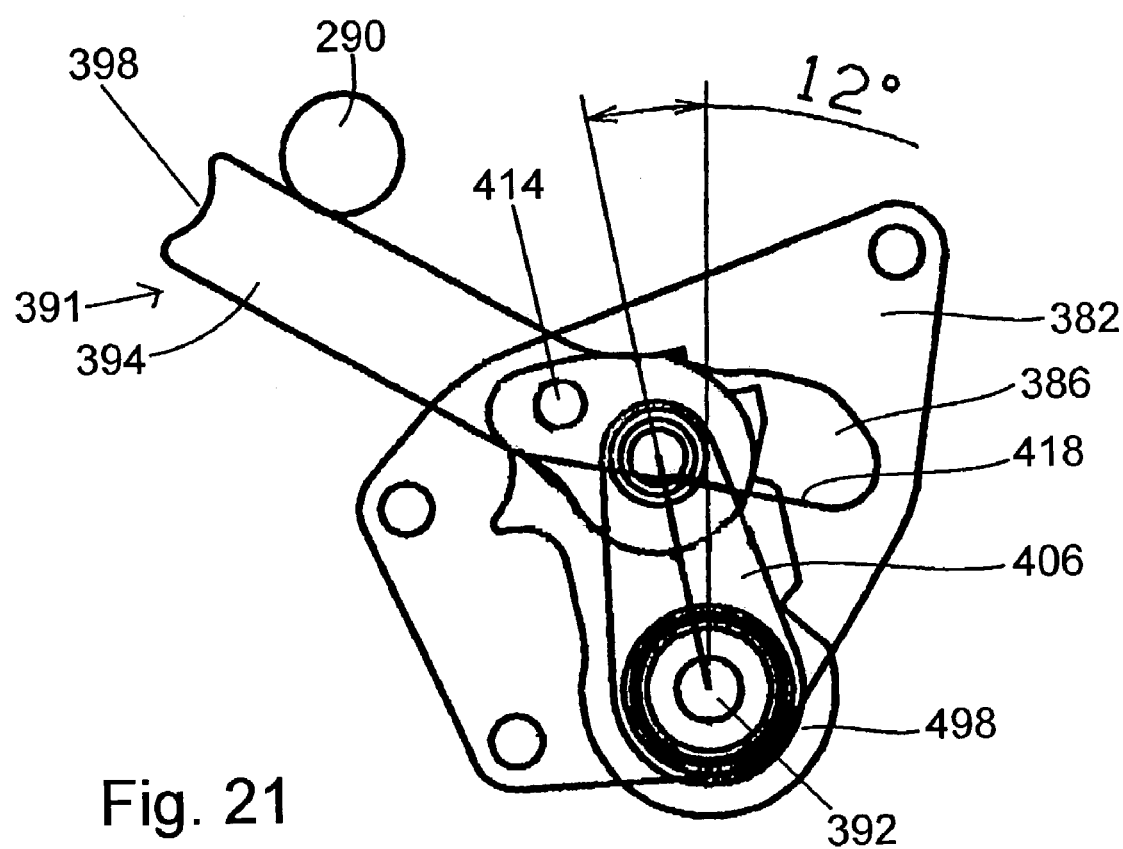
FIG. 21 shows a situation where the rotating member hinders the proper operation of the rotating member engaging member.

FIG. 21 shows a situation where the drive member 290 may hinder the proper operation of the assist mechanism 14, and particularly in the downshift direction shown in FIGS. 17(A)–17(F). Assume the rider operates shift control device 84 to downshift front derailleur 70 at approximately the same time that drive member 290 is in the vicinity of rotating member engaging member 394. In this situation, drive member 290 may contact the side of rotating member engaging member 394 as shown in FIG. 21. If is assumed that motion transmitting member 498 must rotate 20° from the position shown in FIG. 17(A) to the position shown in FIG. 17(B) in order for mode change pawl 514 to contact motion transmitting pawl 506 and set motion transmitting pawl 506 in the proper position for the subsequent downshift operation, then it is possible that drive member 290 will prevent motion transmitting member 498 from moving the proper amount. Instead, motion transmitting member 498 may move a lesser amount (e.g., 12° as shown in FIG. 21), and mode change pawl 514 will not move to the proper position. As a result, motion transmitting pawl 506 will be in the upshift position shown in FIG. 16(B), and assist mechanism 14 will cause front derailleur 70 to upshift, which is opposite the downshift operation intended by the rider.

Figure 22:
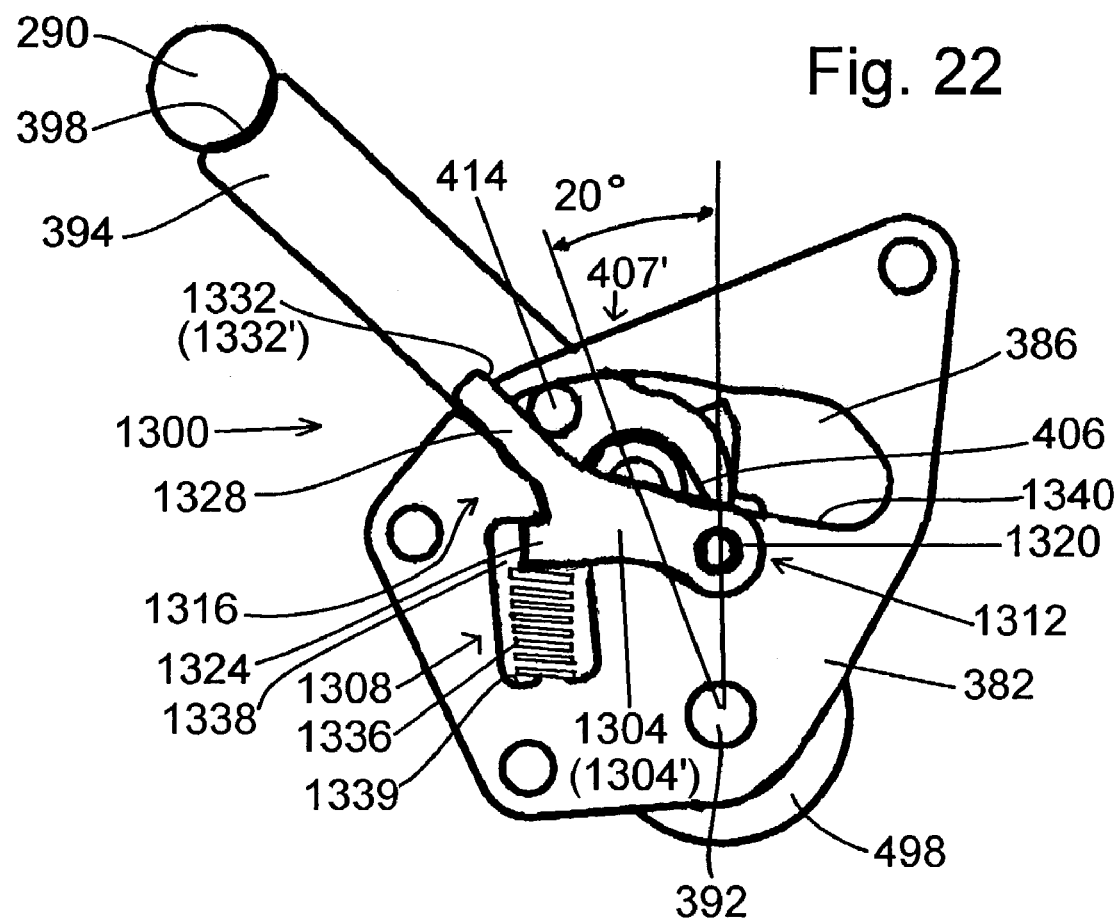
FIG. 22 shows an embodiment of a power saving unit for the rotating member engaging member in an idle state.

FIG. 22 shows an embodiment of a power saving unit 1300 that saves power communicated between the setting mechanism 407 (FIG. 9(A)) and the rotating member engaging member 394 when the setting mechanism 407 attempts to move the rotating member engaging member 394 into the rotating member engaging position and the rotating member engaging member 394 encounters a force that resists the rotating member engaging member 394 being in the rotating member engaging position. In this embodiment, power saving unit 1300 comprises a power saving element, such as a power saving cam 1304, and a biasing mechanism 1308. In this embodiment, power saving cam 1304 has the shape of a forked power saving lever with a first end portion 1312 and a second end portion 1316. First end portion 1312 is rotatably mounted to cam plate 382 through a pivot shaft 1320, thus creating a power saving link. Second end portion 1316 has a bias engaging projection 1324 and a power saving cam projection 1328 with a power saving cam surface 1332. Bias engaging projection 1324 engages biasing mechanism 1308 which, in this embodiment, has the form of a spring 1336. Spring 1336 is disposed in an opening 1338 formed in cam plate 382, wherein the upper portion of spring 1336 engages bias engaging projection 1324 and the lower portion of spring 1336 engages an abutment 1339 formed at the bottom of opening 1338. Spring 1336 biases the second end portion 1316 of power saving cam 1304 to a normal position which, in turn, biases rotating member engaging member 394 toward the rotating member engaging position during the shifting operation.

As shown in FIG. 22, in this embodiment cam follower 414 contacts power saving cam surface 1332. A setting mechanism 407' in this embodiment thus comprises positioning unit interface plate 402, support plate 406, cam follower 414 and power saving cam surface 1332. During normal operation, rotation of positioning unit interface plate 402 in the manner shown in FIGS. 16(A)–16(E) or 17(A)–17(F) causes cam follower 414 to move along power saving cam surface 1332, with spring 1336 biasing power saving cam projection 1328 upwardly. This, in turn, causes rotating member engaging member 394 to rotate around cam follower 414 into the rotating member engaging position shown in FIG. 22 so that rotating member engaging surface 398 contacts drive member 290. Since power saving cam surface 1332 functions in a manner similar to control cam surface 418 in the first embodiment, power saving cam 1304 can be considered a control cam 1304' with a control cam surface 1332'. In general, power saving cam 1304 should be disposed in close proximity to control cam 1304' so that power saving cam 1304 can perform its power saving function (described below). In this embodiment, power saving cam 1304 and control cam 1304' are the same member. In other embodiments where cam follower 414 has a greater range of motion, then control cam 1304' may comprise a surface 1340 formed at the bottom of slot 386, or it may comprise a separate cam surface disposed adjacent to power saving cam 1304.

Figure 23:
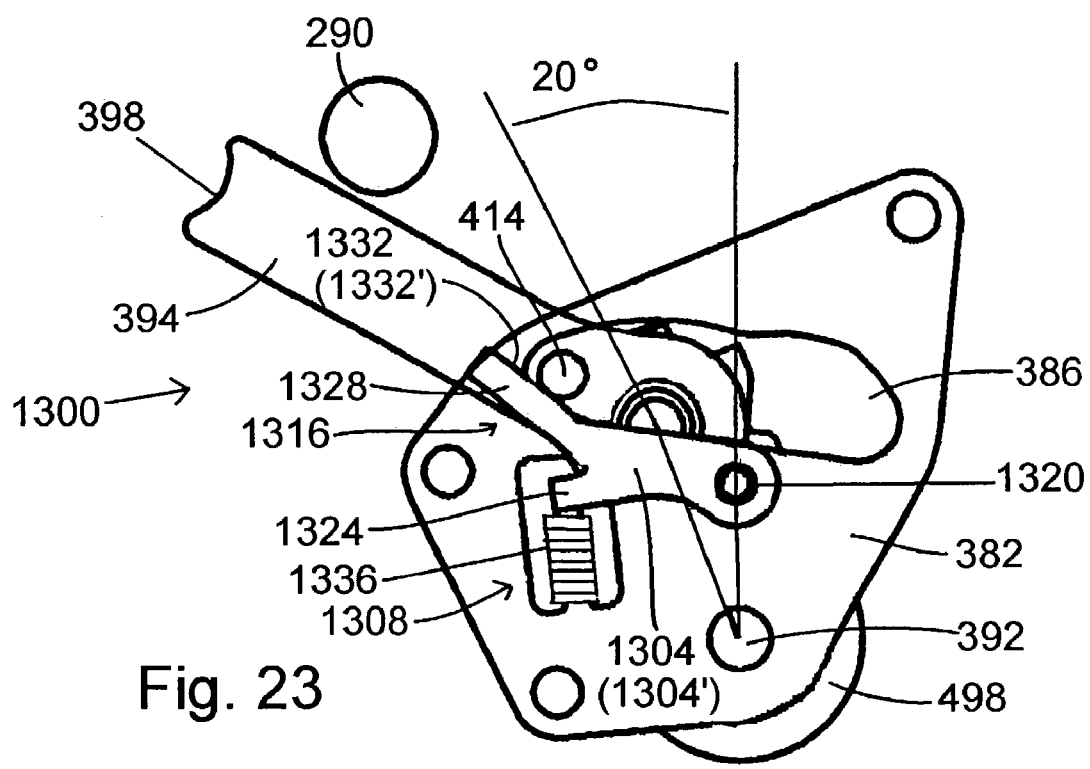
FIG. 23 shows the power saving unit in an activated state.

FIG. 23 shows the power saving unit 1300 in an activated state. In general, power saving unit 1300 saves power communicated between the setting mechanism 407' and the rotating member engaging member 394 when the setting mechanism 407' attempts to move rotating member engaging member 394 into the rotating member engaging position and the rotating member engaging member 394 encounters a force that resists the rotating member engaging member 394 being in the rotating member engaging position. More specifically if drive member 290 contacts the side of rotating member engaging member 394 at approximately the same time that setting mechanism 407' is attempting to move rotating member engaging member 394 into the rotating member engaging position, then power saving cam 1316 rotates around pivot shaft 1320 from a normal position shown in FIG. 22 to a power saving position shown in FIG. 23. In the power saving position, spring 1336 is in a compressed state, and power from setting mechanism 407' is stored while rotating member engaging member 394 is allowed to move away from the rotating member engaging position as necessary to avoid interference with the drive member 290. Thereafter, spring 1336 expands so that cam follower moves upwardly, and rotating member engaging member rotates around cam follower 414. As a result, motion transmitting member 498 may move into the 20° position necessary to activate mode change pawl 514, and the shifting operation (particularly the downshifting operation) proceeds accordingly when the next drive member 290 engages rotating member engaging surface 398 of rotating member engaging member 394.

Figure 24:
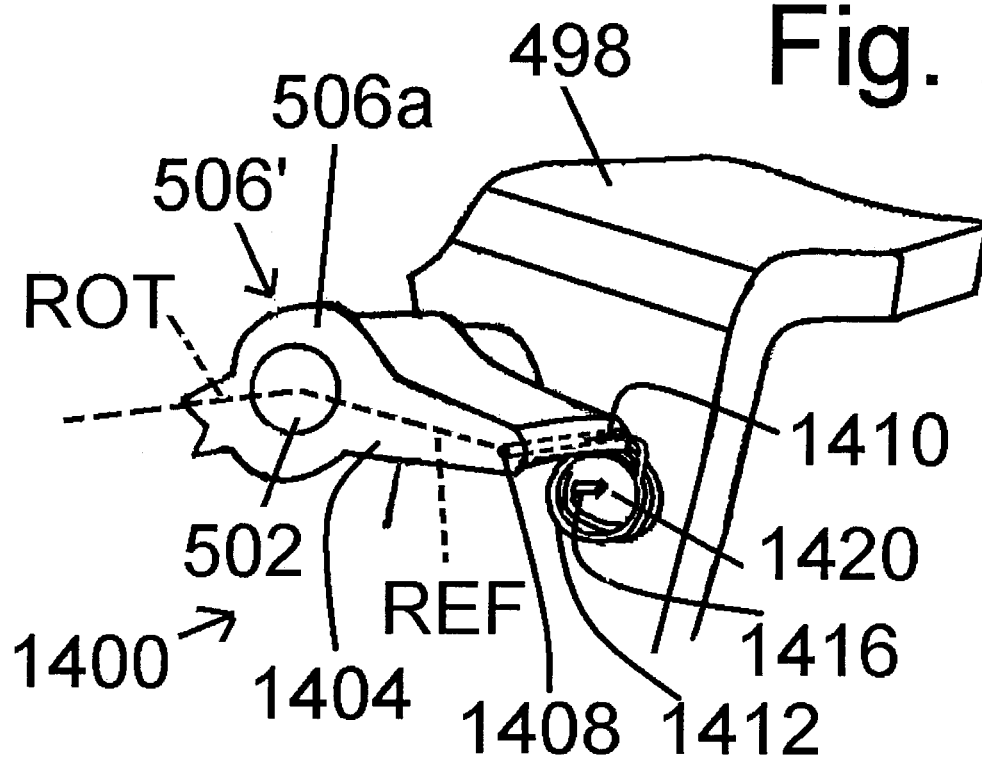
FIG. 24 shows an embodiment of a pawl assist apparatus.

There are a number of ways to ensure that motion transmitting paw 506 moves to the proper positions for the upshifting and downshifting operations. FIG. 24 shows an embodiment of a pawl assist apparatus 1400 that also performs such a function. In this embodiment, a motion transmitting pawl 506' includes an elongated portion 1404 extending rearwardly from base 506a, wherein base 506a rotates around a rotational axis ROT. Elongated portion 1404 includes a spring mounting hole 1408 for receiving a first end 1410 of a coil spring 1412. A second end 1416 of coil spring 1412 is inserted into an opening 1420 in motion transmitting member 498, wherein motion transmitting member 498 functions as a reference member in this embodiment. A reference axis REF extends from rotational axis ROT through elongated portion 1404 and spring mounting hole 1408. In this embodiment, there are no other attachments of spring 1412 to either motion transmitting member 498 or motion transmitting pawl 506'. Spring 1412 includes a center of bias CB (FIG. 25(A)) and provides a slight upward bias to elongated portion 1404 which, in turn, creates a counterclockwise bias to motion transmitting pawl 506'. In this configuration, assist mechanism 14 operates in the same manner as shown in FIGS. 16(A)–16(E) when an upshift operation is desired.

Figure 25A:
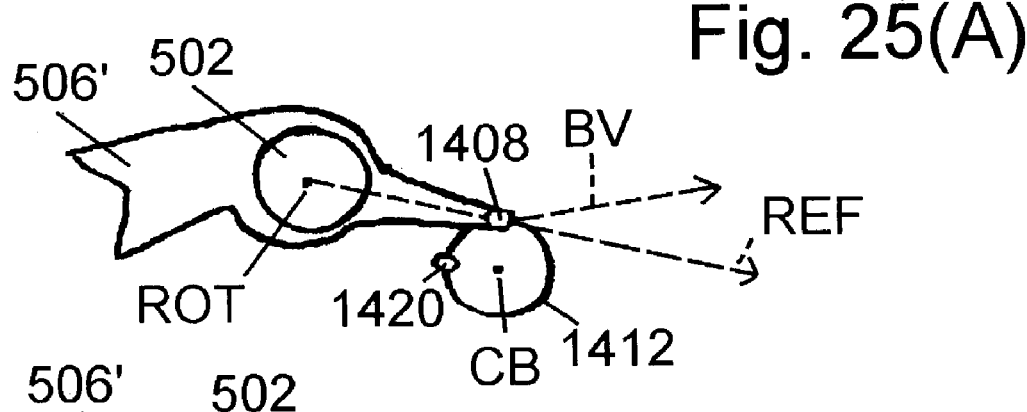
FIGS. 25(A)–25(D) are schematic diagrams illustrating the operation of the pawl assist apparatus shown in FIG. 24.
Figure 25B:
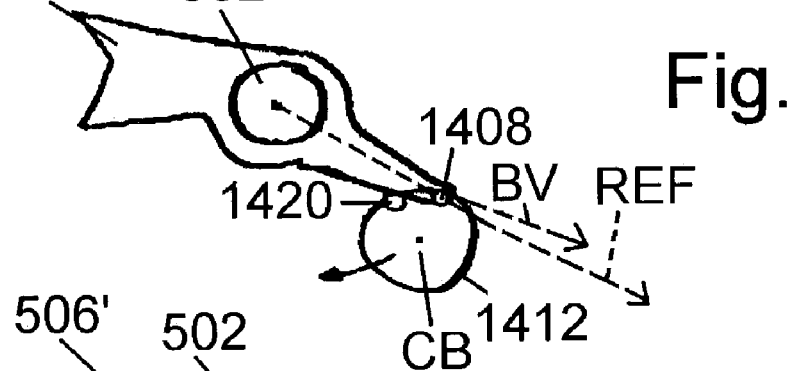

Pawl assist apparatus 1400 causes assist mechanism 14 to operate slightly differently from that shown for the downshifting operation in FIGS. 17(A)–17(F). The operation of pawl assist apparatus 1400 when a downshift operation is desired may be understood by reference to FIGS. 25(A)–25(D). In FIG. 25(A), pawl assist apparatus 1400 is in the same position shown in FIG. 24. In this position, the center of bias CB and second end 1416 of coil spring 1412 (represented by opening 1420) are disposed on the lower side of reference axis REF, and a biasing vector BV points to the upper side of reference axis REF, thereby applying a counterclockwise bias to motion transmitting pawl 506'. When control plate 518 is rotated in the counterclockwise direction as shown in FIG. 17(B) to perform a downshift operation, transition surface 618b of control plate 518 causes motion transmitting pawl 506' to rotate in the clockwise direction around rotational axis ROT as shown in FIG. 25(B). As a result, coil spring 1412 and center of bias CB rotate clockwise around opening 1420, and pivot reference axis REF rotates around rotational axis ROT toward opening 1420. Opening 1420 and center of bias CB are still located below pivot reference axis REF, so bias vector BV still points above the pivot reference axis REF and provides an even slighter counterclockwise bias to motion transmitting pawl 506'.

Figure 25C:
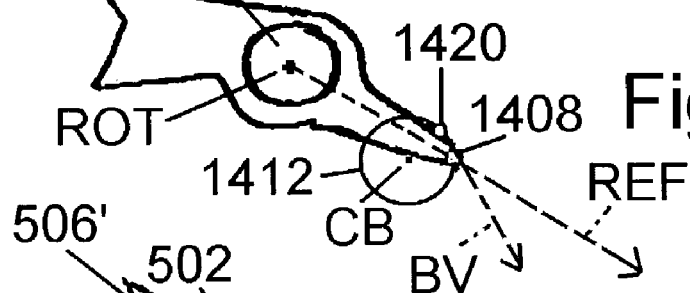
Figure 25D:
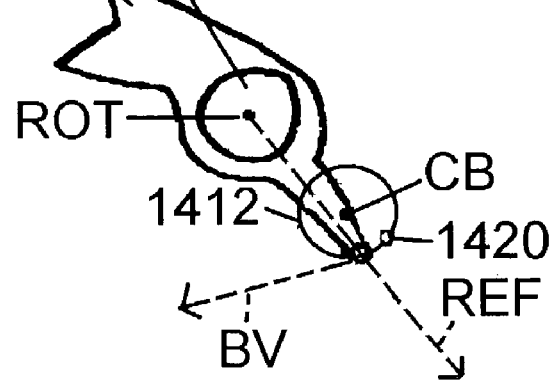

When opening 1420 passes above the reference axis REF as shown in FIG. 25(C), the biasing vector BV switches direction relative to reference axis REF and now points to the lower side of reference axis REF. In this configuration, spring 1412 applies a clockwise bias to motion transmitting pawl 506'. Further rotation of motion transmitting pawl 506' causes center of bias CB to move above pivot reference axis REF, thus placing motion transmitting pawl 506' in a stable position (similar to the position shown in FIG. 17(B)) to ensure a proper downshifting operation, even when one of the drive members 290 do not properly engage rotating member engaging member 394. When rotating member engaging member 394 engages rotating member 290, the downshift operation continues as shown in FIGS. 17(C)–17(F).

As noted above, release plate 486 is allowed to reverse direction even when motion transmitting member 498 is still rotating in the counterclockwise direction. More specifically, when the motion transmitting member 498 is located in the position shown in FIGS. 17(C) and 18(A), downshift control surface 506c of motion transmitting pawl 506' (similar to that shown for motion transmitting pawl 506) begins to contact the pawl control surface 660 of middle plate 466 as shown in FIG. 18(A). Further rotation of motion transmitting member 498 causes motion transmitting pawl 506' to rotate counterclockwise as shown in FIGS. 17(D) and 18(B) (around rotational axis ROT in FIGS. 24 and 25(A)–25(C)). This, in turn, causes motion transmitting pawl 506' to disengage from release plate 486. Consequently, release plate 486 is allowed to return immediately to the position shown in FIG. 17(D), even when motion transmitting member 498 is still in the counterclockwise position shown in FIG. 17(D).

When motion transmitting pawl 506' engages pawl control surface 660 of middle plate 466 and rotates counterclockwise around rotational axis ROT, the second end 1416 of spring 1412 and the center of bias CB return below the reference axis REF. As a result, the biasing vector BV switches direction relative to reference axis REF so that the biasing vector BV again points to the upper side of reference axis REF and returns motion transmitting pawl 506' to the stable position shown in FIG. 25(A). Pawl assisting apparatus 1400 thus provides a stable biasing mechanism for motion transmitting pawl 506', and in some applications mode change pawl 514 may be eliminated entirely.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A power saving apparatus for an assisting apparatus that uses power from a rotating member to assist the operation of a bicycle transmission, wherein the power saving apparatus comprises:
 a rotating member engaging member that moves between a rotating member engaging position, wherein the rotating member engaging member is capable of engaging the rotating member as the rotating member rotates while the bicycle is being operated so that power from the rotating member assists the operation of the bicycle transmission while the rotating member engaging member engages the rotating member, and a rotating member disengaging position, wherein the rotating member engaging member is disengaged from the rotating member as the rotating member rotates while the bicycle is being operated;
 a setting mechanism that sets the rotating member engaging member toward the rotating member engaging position; and
 a power saving unit that saves power communicated between the setting mechanism and the rotating member engaging member when the setting mechanism attempts to move the rotating member engaging member into the rotating member engaging position and the rotating member engaging member encounters a force that resists the rotating member engaging member being in the rotating member engaging position.

2. The apparatus according to claim 1 wherein the power saving unit comprises a biasing mechanism that biases the rotating member engaging member toward the rotating member engaging position.

3. The apparatus according to claim 2 wherein the biasing mechanism allows the rotating member engaging member to move toward the rotating member disengaging position when the setting mechanism attempts to set the rotating member engaging member toward the rotating member engaging position and the rotating member engaging member encounters the force that resists the rotating member engaging member being in the rotating member engaging position.

4. The apparatus according to claim 3 wherein the biasing mechanism comprises a spring.

5. The apparatus according to claim 1 wherein the setting mechanism comprises:
 a control cam;
 a cam follower; and
 wherein one of the control cam and the cam follower is coupled to the rotating member engaging member so that engagement of the cam follower with the control cam causes the rotating member engaging member to move toward the rotating member engaging position.

6. The apparatus according to claim 5 wherein the power saving unit comprises a power saving cam disposed in close proximity to the control cam.

7. The apparatus according to claim 6 wherein the cam follower can engage the control cam and the power saving cam.

8. The apparatus according to claim 7 wherein the power saving cam moves between a normal position and a power saving position, wherein the rotating member engaging member can move to the rotating member engaging position when the power saving cam is in the normal position.

9. The apparatus according to claim 8 wherein engagement between the power saving cam and the cam follower can move the power saving cam toward the power saving position.

10. The apparatus according to claim 9 wherein the power saving unit further comprises a biasing mechanism that biases the power saving cam toward the normal position.

11. The apparatus according to claim 10 wherein the control cam and the power saving cam are the same element.

12. The apparatus according to claim 11 wherein the biasing mechanism comprises a spring.

13. The apparatus according to claim 9 wherein the setting mechanism comprises a power communicating member that moves the rotating member engaging member so that the cam follower engages the control cam.

14. The apparatus according to claim 13 wherein the power communicating member moves the rotating member engaging member so that the cam follower engages the power saving cam.

15. The apparatus according to claim 14 wherein the cam follower moves the power saving cam toward the power saving position when the rotating member engaging member encounters the force that resists the rotating member engaging member being in the rotating member engaging position.

16. The apparatus according to claim 15 wherein the rotating member engaging member includes a first portion and a second portion, wherein the one of the control cam and the cam follower is disposed between the first portion and the second portion, and wherein the first portion includes a rotating member engaging surface.

17. The apparatus according to claim 16 wherein the rotating member engaging member rotates between the rotating member engaging position and the rotating member disengaging position.

18. The apparatus according to claim 17 wherein the second portion of the rotating member engaging member is coupled to the power communicating member.

19. The apparatus according to claim 18 wherein movement of the power communicating member causes the rotating member engaging member to rotate around the cam follower so that the rotating member engaging member rotates to the rotating member engaging position.

20. The apparatus according to claim 19 wherein the rotating member engaging member comprises a rotating member engaging lever having a first end and a second end.

21. The apparatus according to claim 19 wherein the power saving cam rotates between the normal position and the power saving position.

22. The apparatus according to claim 21 wherein the rotating member engaging member engages the power saving cam when the rotating member engaging member is in the rotating member engaging position.

23. The apparatus according to claim 22 wherein the rotating member engaging member comprises a rotating member engaging lever having a first end and a second end.

24. The apparatus according to claim 23 wherein the power saving cam comprises a power saving lever.

25. The apparatus according to claim 24 wherein the power saving lever has a first end and a second end, wherein the power saving lever rotates around the first end.

26. The apparatus according to claim 25 wherein the power saving unit further comprises a biasing mechanism that biases the second end of the power saving lever toward the normal position.

27. The apparatus according to claim 26 wherein the biasing mechanism comprises a spring.

28. The apparatus according to claim 1 wherein the rotating member engaging member rotates between the rotating member engaging position and the rotating member disengaging position.

29. The apparatus according to claim 28 wherein the power saving unit comprises a biasing mechanism that biases the rotating member engaging member toward the rotating member engaging position.

30. The apparatus according to claim 29 wherein the power saving unit comprises a power saving element that rotates between a normal position and a power saving position.

31. The apparatus according to claim 29 wherein the rotating member engaging member comprises a rotating member engaging link.

32. The apparatus according to claim 29 wherein the power saving unit comprises a power saving link.

33. The apparatus according to claim 29 wherein the rotating member engaging member comprises a rotating member engaging link, and wherein the power saving unit comprises a power saving link.

34. The apparatus according to claim 33 wherein the rotating member engaging link engages the power saving link to move the power saving link between a normal position and a power saving position.

35. The apparatus according to claim 34 wherein the rotating member engaging link rotates between the rotating member engaging position and the rotating member disengaging position, and wherein the power saving link rotates between the normal position and the power saving position.

36. A power saving apparatus for an assisting apparatus that uses power from a rotating member to assist the operation of a bicycle transmission, wherein the power saving apparatus comprises:

a rotating member engaging member that moves between a rotating member engaging position, to engage the rotating member so that power from the rotating member assists the operation of the bicycle transmission while the rotating member engaging member engages the rotating member, and a rotating member disengaging position, wherein the rotating member engaging member is disengaged from the rotating member as the rotating member rotates while the bicycle is being operated and the rotating member engaging member is in the rotating member disengaging position;

a setting mechanism that moves to set the rotating member engaging member toward the rotating member engaging position; and a power saving unit that saves power communicated between the setting mechanism and the rotating member engaging member when the setting mechanism attempts to move the rotating member engaging member into the rotating member engaging position and the rotating member engaging member encounters a force that resists the rotating member engaging member being in the rotating member engaging position.

* * * * *